United States Patent
Nishizawa et al.

(10) Patent No.: US 10,122,979 B2
(45) Date of Patent: Nov. 6, 2018

(54) PROJECTOR AND METHOD OF CONTROLLING PROJECTOR

(71) Applicant: SEIKO EPSON CORPORATION, Tokyo (JP)

(72) Inventors: Hideaki Nishizawa, Nagano (JP); Satoru Nasukawa, Matsumoto (JP); Takao Hirakura, Matsumoto (JP); Shohei Minato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/427,734

(22) Filed: Feb. 8, 2017

(65) Prior Publication Data
US 2017/0272717 A1 Sep. 21, 2017

(30) Foreign Application Priority Data
Mar. 16, 2016 (JP) ................. 2016-052185

(51) Int. Cl.
| | | |
|---|---|---|
| *H04N 9/31* | (2006.01) | |
| *G02B 26/08* | (2006.01) | |
| *G03B 21/14* | (2006.01) | |
| *G03B 21/00* | (2006.01) | |
| *H04N 5/04* | (2006.01) | |

(52) U.S. Cl.
CPC ........... *H04N 9/3185* (2013.01); *G02B 26/08* (2013.01); *G03B 21/005* (2013.01); *G03B 21/142* (2013.01); *H04N 9/312* (2013.01); *H04N 9/3188* (2013.01); *H04N 5/04* (2013.01)

(58) Field of Classification Search
CPC .... H04N 9/3185; H04N 9/312; H04N 9/3188; H04N 5/04; G02B 26/08; G03B 21/142
See application file for complete search history.

(56) References Cited

U.S. PATENT DOCUMENTS

| | | | | |
|---|---|---|---|---|
| 2003/0090597 A1* | 5/2003 | Katoh | .................. | H04N 9/3111 348/744 |
| 2008/0252782 A1* | 10/2008 | Komeno | .................. | G09G 5/12 348/512 |

FOREIGN PATENT DOCUMENTS

| | | |
|---|---|---|
| JP | 2014-044384 A | 3/2014 |
| JP | 2016-186557 A | 10/2016 |

* cited by examiner

*Primary Examiner* — Michael E Teitelbaum
(74) *Attorney, Agent, or Firm* — Oliff PLC

(57) ABSTRACT

A projector includes: an I/F unit to which an image signal is input; a display unit that displays an image based on the image signal input to the I/F unit; a shift device that changes a position of an image to be displayed by the display unit; a signal processing unit that outputs a driving signal to the shift device and drives the shift device; and a shift control unit that controls the driving signal output by the signal processing unit. The shift control unit changes an output timing of the driving signal to correspond to a change in a frequency of the image signal.

11 Claims, 14 Drawing Sheets

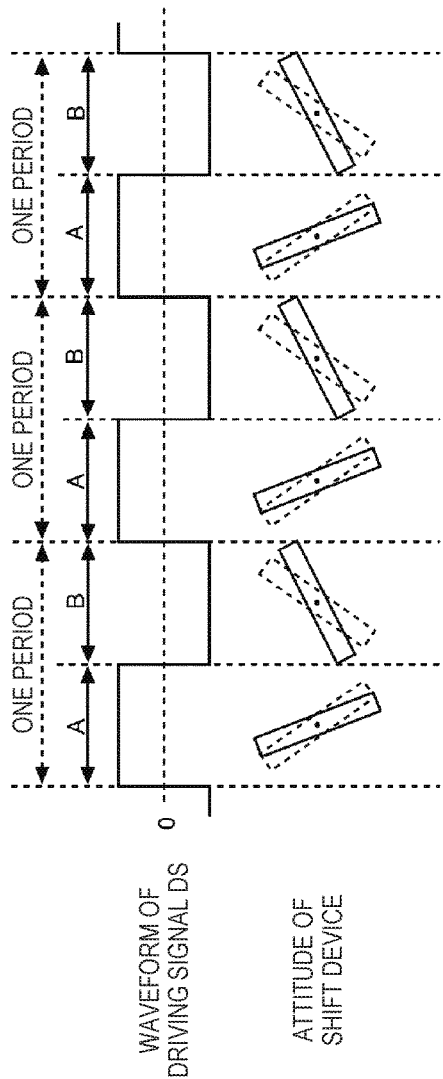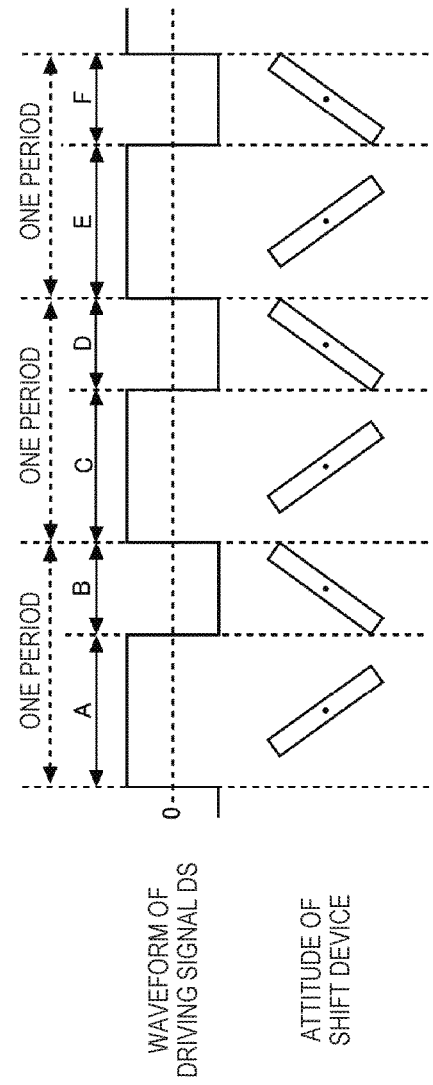
FIG. 15
FIG. 16

PROJECTOR AND METHOD OF CONTROLLING PROJECTOR

CROSS-REFERENCE

The entire disclosure of Japanese Patent Application No. 2016-052185, filed Mar. 16, 2016 is expressly incorporated by reference herein.

BACKGROUND

1. Technical Field

The present invention relates to a projector and a method of controlling the projector.

2. Related Art

In the related art, there are known devices that change traveling directions of light (for example, JP-A-2014-44384).

A light deflector disclosed in JP-A-2014-44384 includes a first rotation unit including a mirror unit and a second rotation unit. The mirror unit is pivoted so that laser light is scanned in the horizontal direction of a screen by the first rotation unit. The mirror is pivoted so that laser light is scanned in the vertical direction of the screen by the second rotation unit.

Incidentally, there are known technologies for improving resolutions of display images artificially by changing display positions of images displayed on display units in projectors. For example, by dividing an input image signal of one frame into image signals of two subframes and changing a display position of an image with first and second subframes by an image displacement unit, it is possible to realize high resolution of the display image artificially.

In a technology for displaying an image using the image displacement unit, a timing at which a display position of an image is changed by the image displacement unit is deviated from a timing at which an image to be displayed is switched in some cases. An effect of high resolution of an image is diminished due to the deviation in the timing, and thus there is a possibility of the quality of a display image deteriorating.

SUMMARY

An advantage of some aspects of the invention is to synchronize a switch timing of a display position of an image with a switch timing of an image and display a high-quality image.

A projector according to an aspect of the invention includes: an input unit to which an image signal is input; a display unit that displays an image based on the image signal input to the input unit; an image displacement unit that changes a position of an image to be displayed by the display unit; a driving unit that outputs a driving signal to the image displacement unit and drives the image displacement unit; and a control unit that controls the driving signal output by the driving unit. The control unit changes an output timing of the driving signal to correspond to a change in a frequency of the image signal.

According to the aspect of the invention, when the frequency of the image signal is changed, the output timing of the driving signal at which the image displacement unit is driven to correspond to the change in the frequency is changed. Accordingly, the timing at which the image displacement unit changes the display position of the image can match the timing at which the image is switched. Thus, it is possible to display a high-quality image.

In the aspect of the invention, the projector may further include a storage unit that stores information in which the frequency of the image signal is associated with the output timing of the driving signal. The control unit may acquire the output timing associated with the frequency of the image signal from the storage unit and cause the driving unit to output the driving signal at the acquired output timing.

According to the aspect of the invention with this configuration, the output timing corresponding to the frequency of the image signal is acquired from the storage unit and the driving signal is output to the driving unit at the acquired output timing. Accordingly, the timing at which the image displacement unit changes the display position of the image can be matched to the timing at which the image is switched according to a simple method.

In the aspect of the invention, the control unit may calculate the output timing associated with the frequency of the image signal and cause the driving unit to output the driving signal at the calculated output timing.

According to the aspect of the invention with this configuration, the control unit calculates the output timing corresponding to the frequency of the image signal and outputs the driving signal to the driving unit at the calculated output timing. Accordingly, even when the frequency of the image signal is changed, the timing at which the image displacement unit changes the display position of the image can be quickly matched to the timing at which the image is switched.

In the aspect of the invention, the control unit may set a delay time of the output timing of the driving signal with respect to a vertical synchronization signal of the image signal.

According to the aspect of the invention with this configuration, the output timing of the driving signal is set as the delay time with respect to the vertical synchronization signal of the image signal. Accordingly, the timing at which the image displacement unit changes the display position of the image can be easily matched to the timing at which the image is switched.

In the aspect of the invention, the control unit may change the output timing of the driving signal in a case in which the frequency of the image signal is different from a preset frequency.

According to the aspect of the invention with this configuration, the timing at which the image displacement unit changes the display position of the image can be changed to correspond to the change in the frequency of the image signal.

In the aspect of the invention, the projector may further include a storage unit that stores information in which the frequency of the image signal is associated with the output timing of the driving signal. The control unit may detect the frequency of the image signal, calculate a correction value for correcting the output timing of the driving signal in a case in which the detected frequency is different from the preset frequency, correct the output timing of the driving signal acquired from the storage unit based on the calculated correction value, and output the corrected output timing of the driving signal to the driving unit.

According to the aspect of the invention with this configuration, in a case in which the detected frequency is different from the preset frequency, the correction value for correcting the output timing of the driving signal is calculated and the output timing of the driving signal is corrected in accordance with the calculated correction value. Accordingly, the timing at which the image displacement unit changes the display position of the image can be changed to correspond to the change in the frequency of the image signal.

In the aspect of the invention, the control unit may calculate a correction value for latening the output timing of the driving signal in a case in which the detected frequency is less than the preset frequency. The control unit may calculate a correction value for advancing the output timing of the driving signal in a case in which the detected frequency is greater than the preset frequency.

According to the aspect of the invention with this configuration, in the case in which the detected frequency is less than the preset frequency, the correction value for latening the output timing of the driving signal is calculated. In the case in which the detected frequency is greater than the preset frequency, the correction value for advancing the output timing of the driving signal is calculated. Accordingly, the timing at which the image displacement unit changes the display position of the image can be changed to correspond to the change in the frequency of the image signal.

In the aspect of the invention, the image displacement unit may include an optical member, a movable unit that holding the optical member, and an actuator that pivots the movable unit. The control unit may change a current value of a driving current to be supplied as the driving signal to the image displacement unit according to the frequency of the image signal.

According to the aspect of the invention with this configuration, the current value of the driving signal to be supplied to the image displacement unit is changed according to the frequency of the image signal. Accordingly, a time taken until the amplitude of the movable unit becomes a target amplitude can be changed according to the frequency of the image signal.

When the frequency component of multiplication of a basic frequency included in the driving signal is identical to a resonance frequency of the image displacement unit, the amplitude of the image displacement unit may be changed considerably more than an intended amplitude in some cases. Accordingly, by changing the current value of the driving signal according to the frequency of the image signal, it is possible to prevent the amplitude of the image displacement unit from being changed considerably more than the intended amplitude. Further, the amplitude of the image displacement unit can become the target amplitude regardless of the frequency of the image signal.

In the aspect of the invention, the control unit may increase the current value of the driving current to be supplied to the image displacement unit in a case in which the frequency of the image signal is greater than the preset frequency. The control unit may decrease the current value of the driving current to be supplied to the image displacement unit in a case in which the frequency of the image signal is less than the preset frequency.

According to the aspect of the invention with this configuration, in the case in which the frequency of the image signal is greater than the preset frequency, the current value of the driving current to be supplied to the image displacement unit is changed to a large value. In the case in which the frequency of the image signal is less than the preset frequency, the current value of the driving current to be supplied to the image displacement unit is changed to a small value.

A projector according to another aspect of the invention includes: a detection unit that detects an attitude of the projector; an input unit to which an image signal is input; a display unit that displays an image based on the image signal input to the input unit; an image displacement unit that includes an optical member held to be pivotable and changes a position of an image displayed by the display unit to a first display position and a second display position according to an attitude of the optical member; a driving unit that outputs a driving signal to the image displacement unit to drive the image displacement unit; and a control unit that controls the driving signal output by the driving unit. The control unit sets a waveform of the driving signal output by the driving unit according to the attitude of the projector detected by the detection unit.

According to the aspect of the invention, the change in the attitude of the optical member can be controlled by adjusting the waveform of the driving signal. Accordingly, it is possible to appropriately display the image at the first display position and the second display position.

In the aspect of the invention, the image displacement unit may include a movable unit that holds the optical member and an actuator that pivots the movable unit.

According to the aspect of the invention with this configuration, the movable unit holding the optical member can be pivoted by the actuator.

A method of controlling a projector according to still another of the invention is a method of controlling a projector including a display unit that displays an image and an image displacement unit that changes a position of an image to be displayed by the display unit. The method includes: inputting an image signal; displaying, by the display unit, an image based on the image signal; driving the image displacement unit according to a driving signal to change the position of the image to be displayed by the display unit; and changing an output timing at which the driving signal is output to the image displacement unit according to a change in a frequency of the image signal.

According to the aspect of the invention, when the frequency of the image signal is changed, the output timing of the driving signal for driving the image displacement unit is changed to correspond to the change in the frequency. Accordingly, the timing at which the image displacement unit changes the display position of the image can be matched to the timing at which the image is switched, and thus it is possible to display a high-quality image.

A method of controlling a projector according to yet another of the invention is a method of controlling a projector including a display unit that displays an image and an image displacement unit that includes an optical member held to be pivotable and changes a position of an image displayed by the display unit to a first display position and a second display position according to an attitude of the optical member. The method includes: inputting an image signal; displaying, by the display unit, an image based on the image signal; driving the image displacement unit according to a driving signal to change the position of the image to be displayed by the display unit; detecting an attitude of the projector; and setting a waveform of the driving signal according to the detected attitude of the projector.

According to the aspect of the invention, the change in the attitude of the optical member can be controlled by adjusting the waveform of the driving signal. Accordingly, it is possible to appropriately display the image at the first display position and the second display position.

BRIEF DESCRIPTION OF THE DRAWINGS

The invention will be described with reference to the accompanying drawings, wherein like numbers reference like elements.

FIG. 15 is a diagram illustrating an attitude of a shift device when the projector is inclined.

FIG. 16 is a diagram illustrating an attitude of the shift device after the waveform of a driving signal is modified.

DESCRIPTION OF EXEMPLARY EMBODIMENTS

First Embodiment

Hereinafter, an embodiment of the invention will be described with reference to the drawings.

Figure 1:
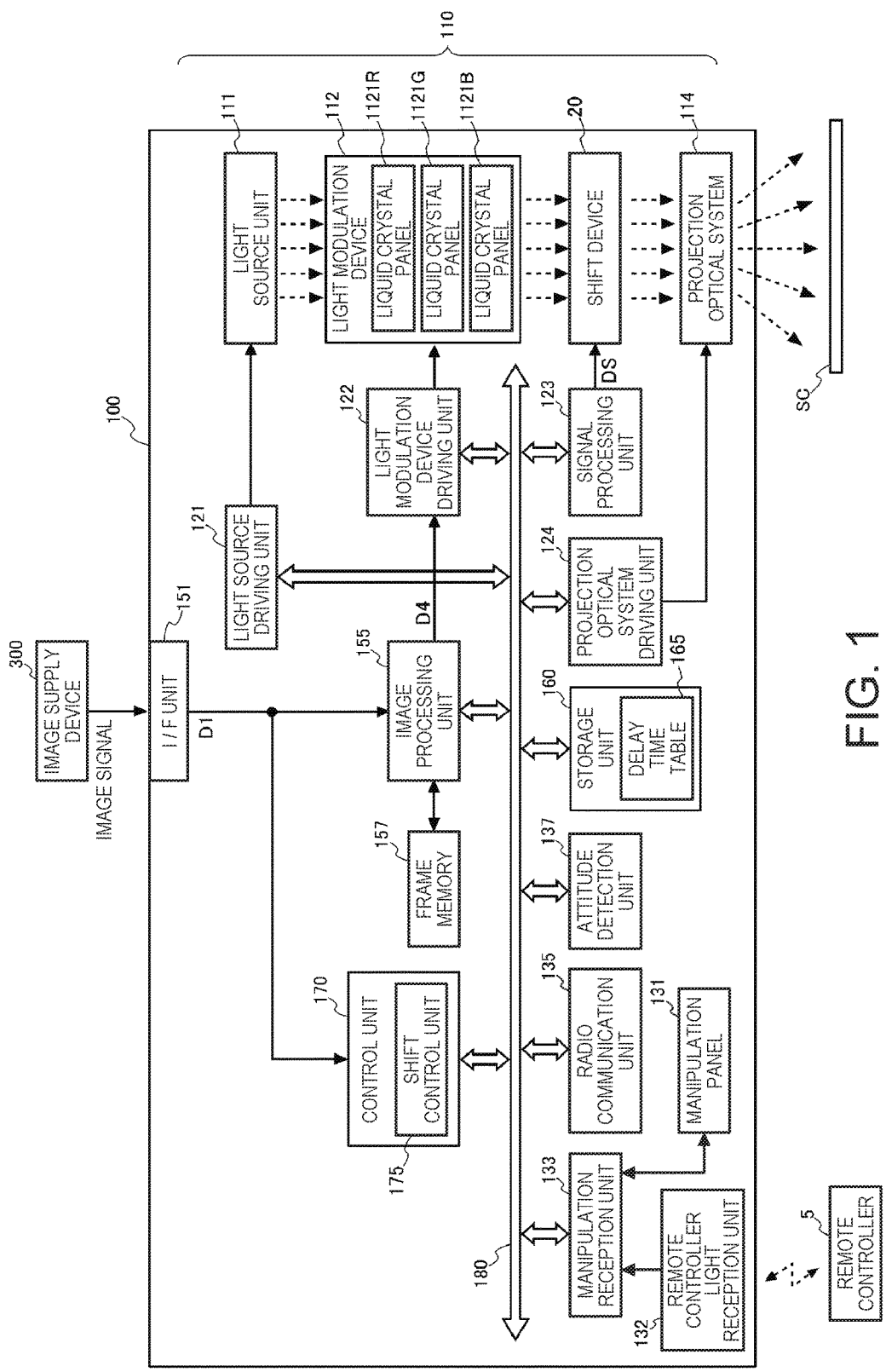
FIG. 1 is a diagram illustrating the configuration of a projector.

FIG. 1 is diagram illustrating the configuration of a projector 100.

The projector 100 is connected to an external image supply device 300 such as a personal computer or any of various video players and projects an image based on an image signal supplied from the image supply device 300 as a projection target.

For example, a personal computer or a video output device such as a video reproduction device, a digital versatile disk (DVD) reproduction device, a television tuner device, a cable television (CATV) set-top box, or a video game device can be used as the image supply device 300. The projection target may be an object, such as building or an object, which is not equally flat or may be a screen SC or an object which has a flat projection surface such as a wall surface of a building. FIG. 1 exemplifies a case in which the projection target is the planar screen SC.

The projector 100 includes an interface unit (hereinafter an interface is abbreviated to an I/F) 151 as an interface connected to the image supply device 300. The I/F unit 151 is equivalent to an "input unit" according to the invention.

The I/F unit 151 includes a connector and an I/F circuit (neither of which is illustrated) connected to a cable and input an image signal supplied from the image supply device 300 connected via the cable. The I/F unit 151 converts the input image signal into image data (hereinafter referred to as image data D1) and outputs the image data to an image processing unit 155.

The image signal supplied from the image supply device 300 includes a synchronization signal such as a vertical synchronization signal or a horizontal synchronization signal. The I/F unit 151 acquires the synchronization signal from the image signal and outputs the synchronization signal to a control unit 170. The vertical synchronization signal input to the control unit 170 is referred to as a vertical synchronization signal V1 below.

In the present specification, the image data D1 is assumed to include data of a still image and video data of a moving image or the like.

The interface included in the I/F unit 151 may be, for example, a data communication interface such as Ethernet (registered trademark), IEEE 1394, or USB. The interface of the I/F unit 151 may be an interface for image data such as MHL (registered trademark), HDMI (registered trademark), or a display port.

The I/F unit 151 may be configured to include, as a connector, a VGA terminal to which an analog image signal is input or a digital visual interface (DVI) to which digital image data is input. Further, the I/F unit 151 includes an A/D conversion circuit. In a case in which an analog image signal is input via the VGA terminal, the A/D conversion circuit converts the analog image signal into the image data D1 and outputs the image data D1 to the image processing unit 155.

Broadly, the projector 100 includes a display unit 110 that forms an optical image and an image processing system that electrically processes an image display by the display unit 110. First, the display unit 110 will be described. The display unit 110 includes a light source unit 111, a light modulation device 112, a shift device 20, and a projection optical system 114.

A xenon lamp, an extra-high pressure mercury lamp, a light emitting diode (LED), or the like is used as a light source of the light source unit 111. The light source unit 111 may include a reflection mirror and an auxiliary reflection mirror that guide light emitted by the light source to the light modulation device 112. Further, the light source unit 111 may include a lens group (not illustrated) or a polarization plate to improve optical characteristics of projection light.

The light source unit 111 is driven by a light source driving unit 121. The light source driving unit 121 is connected to an internal bus 180 and operates under the control of the control unit 170 connected to the internal bus 180. The details of the control unit 170 will be described below. The light source driving unit 121 turns on or turns off the light source of the light source unit 111 under the control of the control unit 170.

Light emitted from the light source unit 111 is separated into color components of R, G, and B which are the three primary colors of light by an optical system such as dichroic mirrors 106a and 106b (see FIG. 2), and is subsequently incident on the light modulation device 112.

The light modulation device 112 includes three liquid crystal panels 1121R, 1121G, and 1121B corresponding to the color components of R, G, and B. Hereinafter, in a case in which it is not necessary to distinguish the liquid crystal panels 1121R, 1121G, and 1121B from each other, the liquid crystal panels 1121R, 1121G, and 1121B are collectively referred to as the liquid crystal panels 1121.

The liquid crystal panels 1121 have a configuration in which liquid crystal is sealed between a pair of transparent substrates. The liquid crystal panels 1121 each have a rectangular pixel region in which a plurality of pixels (not illustrated) are arrayed in a matrix form and are configured to apply a driving voltage to the liquid crystal for each pixel.

A light modulation device driving unit 122 driving each of the liquid crystal panels 1121R, 1121G, and 1121B is connected to the light modulation device 112. The light modulation device driving unit 122 is connected to the internal bus 180.

Image data separated into the three primary colors of R, G, and B is input from an image processing unit 155 to be described below to the light modulation device driving unit 122. The light modulation device driving unit 122 converts the input image data of each color into data signals Rv, Gv, and Bv appropriate for operations of the corresponding liquid crystal panels 1121R, 1121G, and 1121B. The light modulation device driving unit 122 applies driving voltages corresponding to the converted data signals Rv, Gv, and Bv to the pixels of the liquid crystal panels 1121R, 1121G, and 1121B and depicts an image on each liquid crystal panel 1121.

Thus, the light emitted from the light source unit 111 is modulated to image light by the light modulation device 112.

The shift device 20 is an element (or a device) that is disposed between the light modulation device 112 and the projection optical system 114 and shifts a light axis (light path) of the image light transmitted through the liquid crystal panels 1121 of the light modulation device 112. The shift device 20 is equivalent to an "image displacement unit" according to the invention.

The shift device 20 includes a glass plate 21 (see FIGS. 8 to 11) and switches an attitude (angle) of the glass plate 21 in a time division manner in synchronization with driving of the light modulation device 112. Thus, one pixel of the liquid crystal panel 1121 can be displayed as two pixels in the time division manner on the screen SC. For example, when one frame is segmented into two subframes and a display position of an image in the two segmented subframes is shifted by the shift device 20, one pixel of the liquid crystal panel 1121 can be displayed as two pixels in one frame. Accordingly, it is possible to project an image with a resolution higher than the resolution of the liquid crystal panel 1121 (for example, 4K when the resolution of the liquid crystal panel 1121 is a full high vision) to the screen SC. The details of the shift device 20 will be described below.

A signal processing unit 123 is connected to the shift device 20. The signal processing unit 123 is connected to the internal bus 180. The signal processing unit 123 outputs a driving signal DS used to drive the shift device 20 to the shift device 20 under the control of the control unit 170. The driving signal DS indicates an alternating current flowing in a coil 252 (see FIG. 10) of a driving mechanism 25 to be described below.

The projection optical system 114 includes a zoom lens that expands or contracts an image to be projected and adjusts a focus or a focus adjustment mechanism that adjusts a focus. The projection optical system 114 projects image light which is modulated by the light modulation device 112 and of which a light axis is shifted by the shift device 20 to the screen SC.

A projection optical system driving unit 124 is connected to the projection optical system 114. The projection optical system driving unit 124 is connected to the internal bus 180.

The projection optical system driving unit 124 includes a stepping motor and gear (neither of which is illustrated), adjusts a lens position of the projection optical system 114 under the control of the control unit 170, and performs zoom adjustment and focus adjustment.

Figure 2:
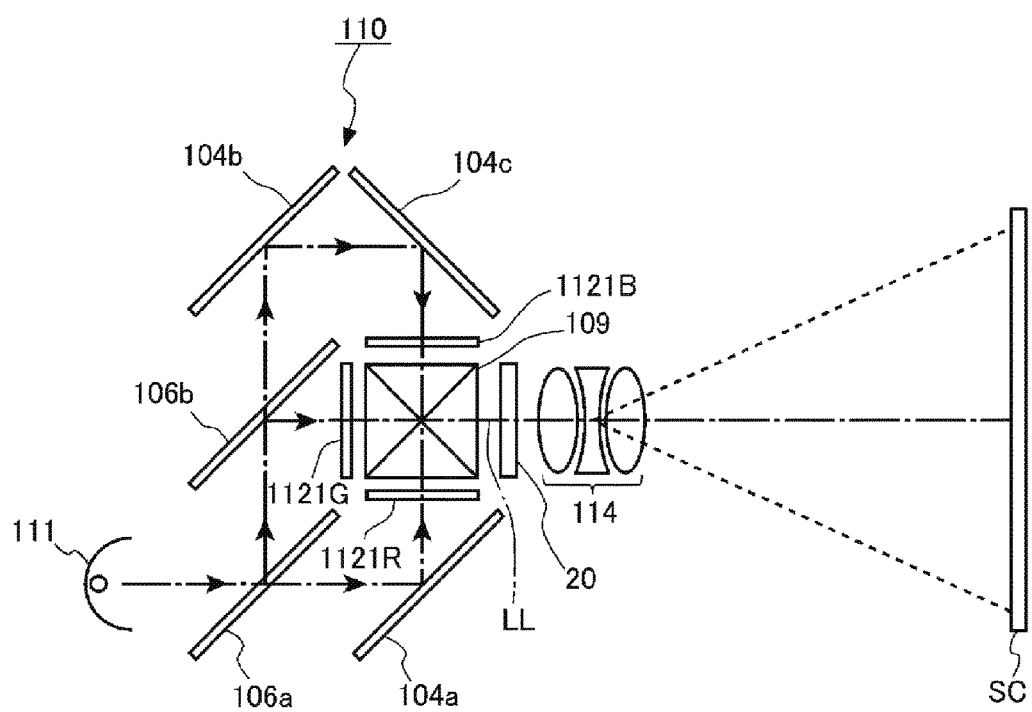
FIG. 2 is a diagram illustrating the configuration of a display unit.

Here, the configuration of the display unit 110 will be described in detail. FIG. 2 is a diagram illustrating the configuration of the display unit 110.

The display unit 110 further includes mirrors 104a, 104b, and 104c and dichroic mirrors 106a and 106b.

The light emitted from the light source unit 111 is first separated into red light (R) and other light by the dichroic mirror 106a. The red light is reflected by the mirror 104a and is subsequently incident on the liquid crystal panel 1121R, and the other light is separated into green light (G) and blue light (B) by the dichroic mirror 106b. The separated green light is incident on the liquid crystal panel 1121G. The separated blue light is reflected by the mirrors 104b and 104c and is subsequently is incident on the liquid crystal panel 1121B.

The driving voltages corresponding to the data signals Rv, Gv, and Bv are applied to the pixels of the liquid crystal panels 1121R, 1121G, and 1121B by the light modulation device driving unit 122. Thus, the pixels of the liquid crystal panel 1121 are set at light transmittance according to image data processed by the image processing unit 155 (hereinafter referred to as image data D4). Therefore, the light emitted from the light source unit 111 is transmitted through the pixel regions of the liquid crystal panels 1121 to be modulated, and thus the image light according to the image data D4 is formed for each piece of color light. The pieces of formed image light of the respective colors are combined by a dichroic prism 109, and thus a full-color image light LL is emitted from the dichroic prism 109.

The shift device 20 is disposed between the dichroic prism 109 and the projection optical system 114. The light axis of the image light LL emitted from the dichroic prism 109 is shifted by the shift device 20, and then the image light LL is expanded by the projection optical system 114 and is projected to the screen SC.

FIG. 2 illustrates the glass plate 21 (see FIGS. 8 to 10 to refer to the glass plate) included in the shift device 20 as a part of the shift device 20.

Figure 3:
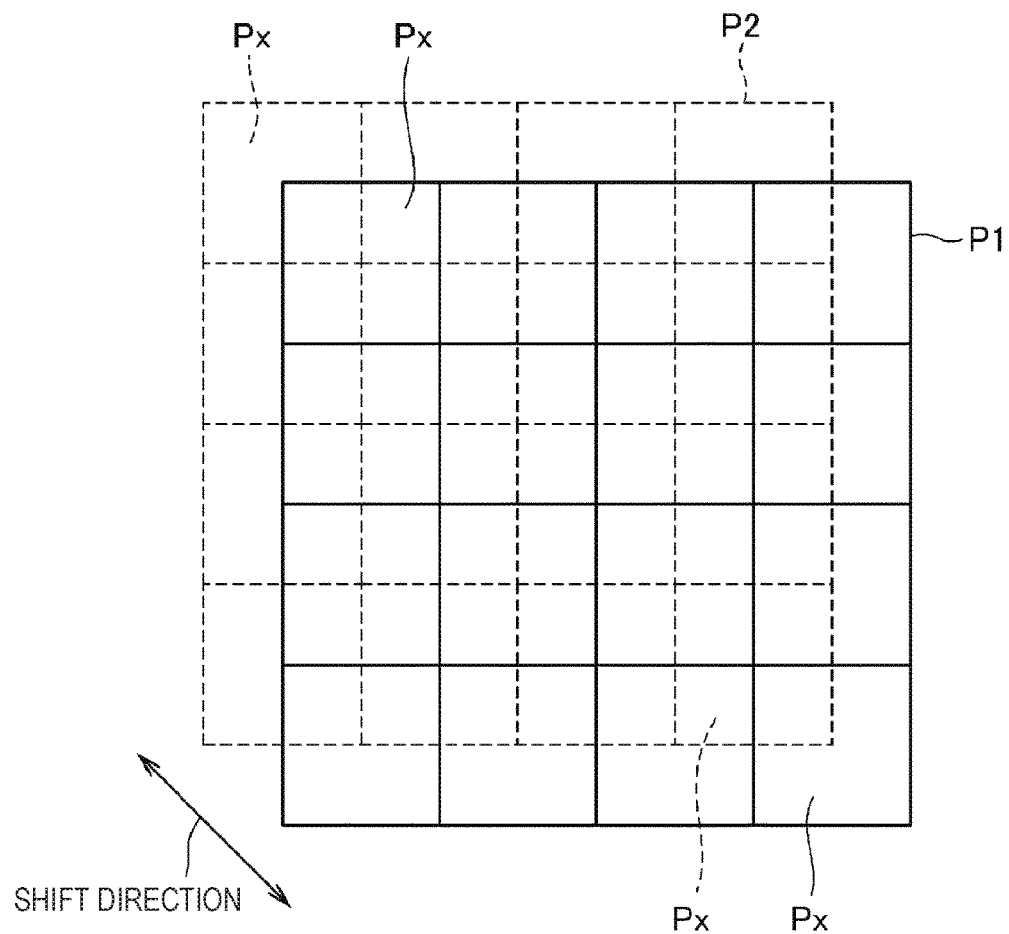
FIG. 3 is a diagram illustrating a shift form of image light.

FIG. 3 is a diagram illustrating a shift form of the light axis of the image light LL.

The shift device 20 includes the glass plate 21. The glass plate 21 has a light incidence surface on which the image light is incident. The shift device 20 shifts the light axis (light path) of the image light LL transmitted through the glass plate 21 by changing the attitude of the glass plate 21. A display position of an image on the screen SC in a case in which the light axis of the image light LL is shifted to one side is referred to as a first display position P1. A display position of the image on the screen SC in a case in which the light axis of the image light LL is shifted to the other side is referred to as a second display position P2. The first display position P1 and the second display position P2 are positions deviated by half of a pixel (that is, half of a pixel Px) in a diagonal direction (an arrow direction in FIG. 2). The pixel Px is a pixel of the liquid crystal panel 1121.

An attitude (angle) of the glass plate 21 when the display position of the image is the first display position P1 is referred to as a first state. An attitude (angle) of the glass plate 21 when the display position of the image is the second display position P2 is referred to as a second state.

The projector 100 moves the display position of the image on the screen SC from the first display position P1 to the second display position P2 and moves the display position of the image from the second display position P2 to the first display position P1. By alternately displaying the image at the first display position P1 and the second display position P2, it is possible to increase the number of apparent pixels of the image projected to the screen SC and achieve a high resolution of the image.

Referring back to FIG. 1, the configuration of the projector 100 will be continuously described.

A manipulation panel 131 including various switches and indicator lamps used for a user to perform a manipulation are mounted on the body of the projector 100. The manipulation panel 131 is connected to a manipulation reception unit 133. The manipulation reception unit 133 appropriately turns on or off the indicator lamp of the manipulation panel 131 according to an operation state or a setting state of the projector 100 under the control of the control unit 170. When a switch of the manipulation panel 131 is manipulated, a manipulation signal corresponding to the manipulated switch is output from the manipulation reception unit 133 to the control unit 170.

The projector 100 includes a remote controller 5 that is used by the user. The remote controller 5 includes various buttons and transmits infrared signals corresponding to manipulations of the buttons. A remote controller light reception unit 132 that receives an infrared signal emitted by the remote controller 5 is mounted on the body of the projector 100. The remote controller light reception unit 132 decodes the infrared signal received from the remote controller 5, generates a manipulation signal indicating manipulation content in the remote controller 5, and outputs the manipulation signal to the control unit 170.

The projector 100 includes a radio communication unit 135. The radio communication unit 135 is connected to the internal bus 180. The radio communication unit 135 includes an antenna or a radio frequency (RF) circuit (not illustrated) and performs radio communication with an external device under the control of the control unit 170. For example, a short-range radio communication scheme such as a wireless local area network (LAN), Bluetooth (registered trademark), an ultra wide band (UWB), or infrared communication or a radio communication scheme using a mobile phone line can be adopted as a radio communication scheme of the radio communication unit 135.

The projector 100 includes an attitude detection unit 137. The attitude detection unit 137 includes, for example, a triaxial acceleration sensor or an azimuth sensor that detects an azimuth. In the attitude detection unit 137, the acceleration sensor detects an attitude of the projector 100 in a gravity direction, that is, pitch and roll angles. The attitude detection unit 137 detects a yaw angle as a relative azimuth to a reference azimuth detected by the azimuth sensor. The attitude detection unit 137 outputs a detection result as attitude information to the control unit 170.

An image processing system of the projector 100 includes the control unit 170 as a main unit controlling the projector 100 and additionally includes the image processing unit 155, a frame memory 157, and a storage unit 160. The control unit 170, the image processing unit 155, and the storage unit 160 are connected to the internal bus 180.

The image processing unit 155 determines an attribute of the image data D1 input from the I/F unit 151 under the control of the control unit 170. For example, the image processing unit 155 determines an image size or a resolution of the image data D1, determines whether an image is 2D (planar) image or a 3D (stereoscopic) image, determines whether an image is a still image or a moving image, and determines a frame rate. The image processing unit 155 writes the image data D1 on the frame memory 157 for each frame and performs image processing on the written image.

Figure 4:
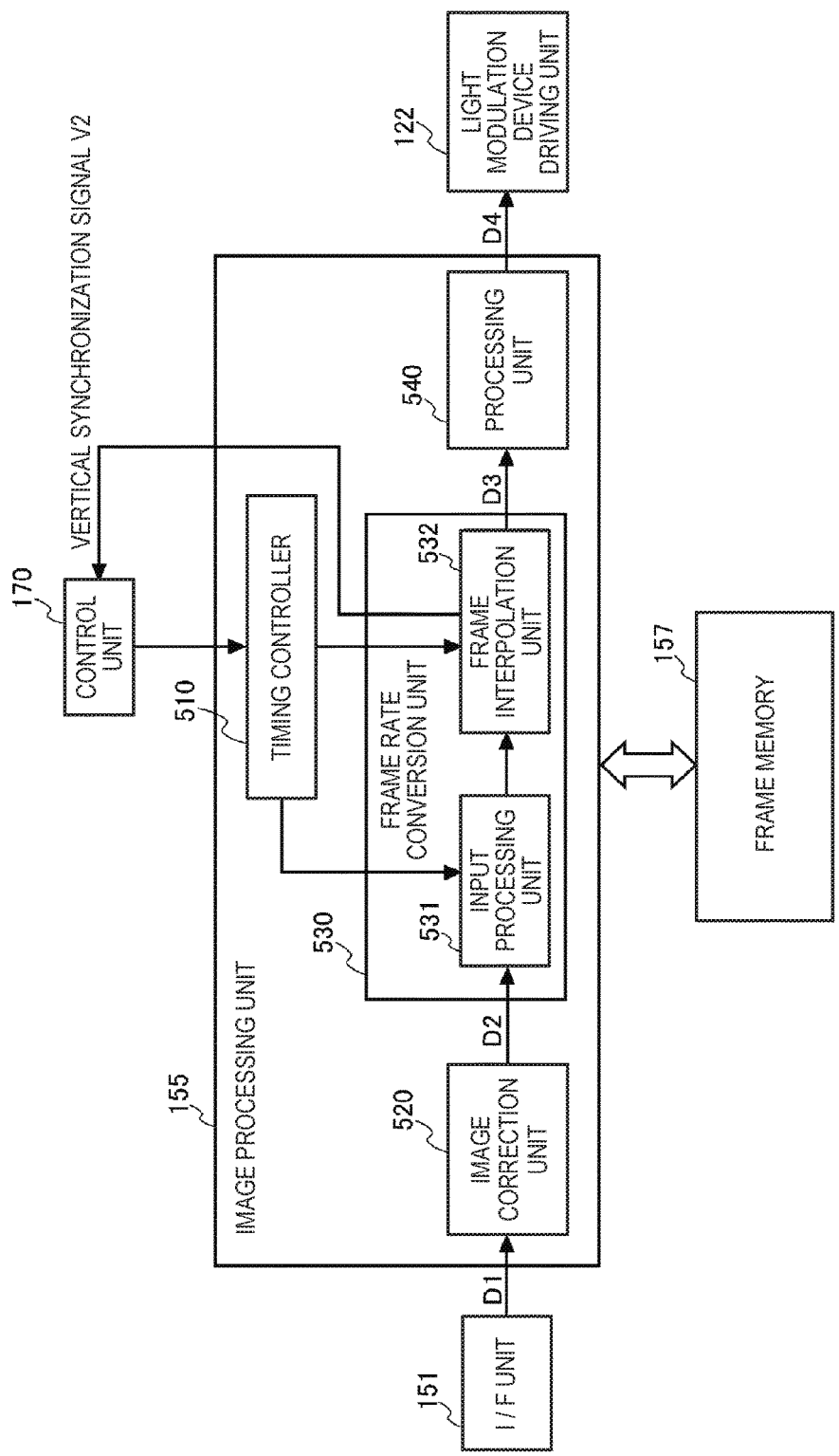
FIG. 4 is a diagram illustrating the configuration of an image processing unit.

FIG. 4 is a diagram illustrating the configuration of the image processing unit 155. To facilitate the understanding, the image processing unit 155 is illustrated in FIG. 4 in tandem with the I/F unit 151, the control unit 170, and the light modulation device driving unit 122.

The image processing unit 155 includes a frame rate conversion unit 530 that performs a frame rate conversion process. The frame rate conversion unit 530 includes an input processing unit 531 and a frame interpolation unit 532. The image processing unit 155 includes an image correction unit 520, a processing unit 540, and a timing controller 510. The timing controller 510 is controlled by the control unit 170.

The image correction unit 520 performs various processes such as a contrast adjustment process and a luminance adjustment process on the image data D1 input from the I/F unit 151 and outputs the processed image data (hereinafter referred to as image data D2) to the input processing unit 531.

The input processing unit 531 writes the image data D2 input from the image correction unit 520 on the frame memory 157. The image data D2 input to the input processing unit 531 includes at least the vertical synchronization signal V1. The input processing unit 531 writes the image data D2 on the frame memory 157 for each frame according to the vertical synchronization signal V1.

The frame interpolation unit 532 reads the image data D2 written on the frame memory 157 for each frame. The frame interpolation unit 532 generates an interpolation frame based on the read frame and outputs image data D3 at a frame rate higher a frame rate of the image data D2 (in the embodiment, a double frame rate). The interpolation frame is an intermediate frame inserted between the frames of the image data D2.

In the embodiment, in a case in which the frame rate of the image data D2 is 50 Hz, the frame interpolation unit 532 generates the image data D3 with a frame rate of 100 Hz. In a case in which the frame rate of the image data D2 is 60 Hz, the frame interpolation unit 532 generates the image data D3 with a frame rate of 120 Hz.

The frame interpolation unit 532 generates a vertical synchronization signal corresponding to the converted frame rate (hereinafter referred to as a vertical synchronization signal V2). The frame interpolation unit 532 outputs the generated vertical synchronization signal V2 to the control unit 170. The frame interpolation unit 532 outputs the generated vertical synchronization signal V2 to the processing unit 540 along with the image data D3.

For example, in a case in which the converted frame rate is 100 Hz, the frame interpolation unit 532 generates the vertical synchronization signal V2 with a frequency of 100 Hz. In a case in which the converted frame rate is 120 Hz, the frame interpolation unit 532 generates the vertical synchronization signal V2 with a frequency of 120 Hz.

When an image is depicted on the liquid crystal panel 1121 at a speed according to the frequency of the converted vertical synchronization signal V2, the light modulation device 112 can display two images during a display period of one frame of the image data D1. That is, during each of two subframes segmented from one frame, each image can be displayed.

When the shift device 20 shifts a display position of an image in synchronization with the frequency of the converted vertical synchronization signal V2, the display positions of the images displayed in subframes can be different positions.

The processing unit 540 performs various processes on the image data D3 output from the frame interpolation unit 532. The processing unit 540 is a processing module that performs various processes such as the above-described resolution conversion process, a digital zoom process, a luminance correction process, and a geometric correction process. The processing unit 540 performs one or more of the foregoing processes. The image processing unit 155 can, of course, have a configuration in which a plurality of processing units to correspond to the plurality of foregoing processes, but one processing unit 540 is illustrated here to facilitate the understanding. Image data processed by the processing unit 540 is referred to as image data D4. The processing unit 540 reads the processed image data D4 from the frame memory 157 and outputs the image data D4 to the light modulation device driving unit 122 along with the vertical synchronization signal V2.

The timing controller 510 controls the input processing unit 531 and the frame interpolation unit 532 included in the frame rate conversion unit 530 under the control of the control unit 170.

Parameters used to set writing and reading timings are input from the control unit 170 to the timing controller 510. The timing controller 510 designates a timing at which the image data D2 of one frame is written on the frame memory 157 to the input processing unit 531 according to the input parameters.

The timing controller 510 designates a timing at which one frame of the image data D2 is read from the frame memory 157 to the frame interpolation unit 532 according to the input parameters.

The timing controller 510 designates the number of interpolation frames generated by the frame interpolation unit 532 and an output timing of the vertical synchronization signal V2 generated by the frame interpolation unit 532.

Referring back to FIG. 1, the configuration of the projector 100 will be continuously described.

The storage unit 160 is configured with a nonvolatile memory such as a flash memory or an electrically erasable programmable read-only memory (EEPROM). The storage unit 160 stores data processed by the control unit 170 and a control program executed by the control unit 170 in a nonvolatile manner.

The storage unit 160 stores a delay time table 165. Information regulating an output timing of a control signal CS is registered in the delay time table 165. The control signal CS is a signal for controlling the driving signal DS output by the signal processing unit 123 and is output from the control unit 170 to the signal processing unit 123.

The projector 100 can display images at a plurality of frame rates. Therefore, information associating a frame rate of an image which can be display by the projector 100 with an output timing of the driving signal DS is registered in the delay time table 165.

A frequency of the vertical synchronization signal V1 and information for setting a delay time until the control signal CS is output after the control unit 170 inputs the vertical synchronization signal V1 are registered in the delay time table 165 according to the embodiment. The frequency of the vertical synchronization signal V1 corresponds to a frame rate of the image which can be displayed by the projector 100 and a delay time corresponds to an output timing of the driving signal DS.

The control unit 170 includes hardware such as a central processing unit (CPU), a read-only memory (ROM), and a random access memory (RAM) (none of which is illustrated) and generally controls each unit of the projector 100.

The ROM is a nonvolatile storage device such as a flash ROM and stores a control program or data. The RAM forms a work area of the CPU. The CPU loads the control program read from the ROM or the storage unit 160 on the RAM, executes the loaded control program, and controls each unit of the projector 100.

The control unit 170 includes a shift control unit 175 as a functional block. The functional block is realized when the CPU executes the control program stored in the ROM or the storage unit 160.

The shift control unit 175 controls an output timing at which the signal processing unit 123 outputs the driving signal DS to the shift device 20. The shift control unit 175 controls a current of the driving signal DS output by the signal processing unit 123.

The synchronization signal (the vertical synchronization signal V1) is input from the I/F unit 151 to the shift control unit 175. The vertical synchronization signal V2 is input from the image processing unit 155 to the shift control unit 175.

The shift control unit 175 detects a frequency of the vertical synchronization signal V1 input from the I/F unit 151. The shift control unit 175 acquires information regarding the delay time associated with the detected frequency of the vertical synchronization signal V1 from the delay time table 165. The shift control unit 175 outputs the control signal CS to the signal processing unit 123 based on the acquired information regarding the delay time. The control signal CS is a signal for controlling an output timing at which the signal processing unit 123 outputs the driving signal DS to the shift device 20. The control signal CS is a signal that defines a current value of the driving signal DS output by the signal processing unit 123.

The signal processing unit 123 outputs the driving signal DS to the shift device 20 in accordance with an input timing of the control signal CS. The signal processing unit 123 changes the current value of the driving signal DS based on a current value included in the input control signal CS.

Thus, a timing at which the driving signal DS which is an alternating current flows in the coil 252 and a pivot timing or a pivot speed at which the current value of the driving signal DS is controlled and the movable unit 22 of the shift device 20 is pivoted are adjusted.

Figure 5:
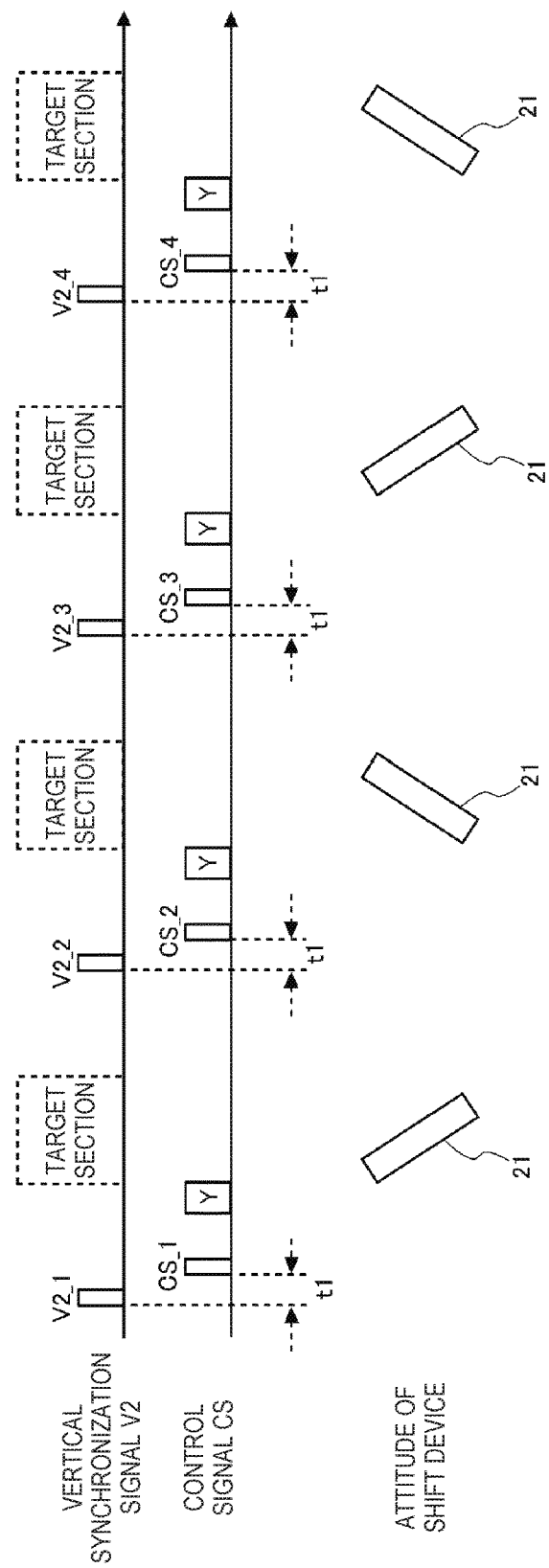
FIG. 5 is a diagram illustrating a frequency of a vertical synchronization signal and an output timing of a control signal.
Figure 6:
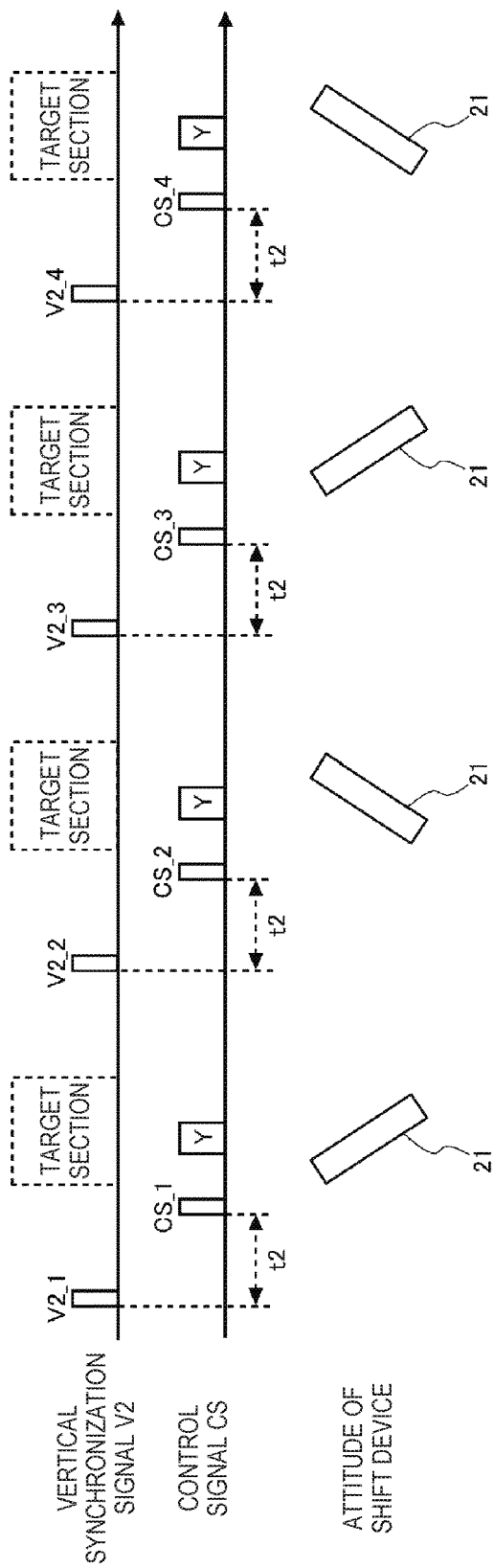
FIG. 6 is a diagram illustrating a frequency of a vertical synchronization signal and an output timing of a control signal.

Here, a relation between the frequency of the vertical synchronization signal V2 of the image data D4 and the output timing of the control signal CS will be described. FIGS. 5 and 6 are diagrams illustrating the relation between the frequency of the vertical synchronization signal V2 and the output timing of the control signal CS.

FIGS. 5 and 6 illustrate attitudes of the glass plate 21 of the shift device 20 and output timings of the vertical synchronization signal V2 and the control signal CS. In FIGS. 5 and 6, letters "V2_1", "V2_2", "V2_3", and "V2_4" are affixed to rectangular waveforms indicating the vertical synchronization signal V2. Further, letters "CS_1", "CS_2", "CS_3", and "CS_4" are affixed to rectangular waveforms indicating the control signal CS. FIG. 5 illustrates a case in which an angle of the glass plate 21 of the shift device 20 is not a predetermined angle when an image based on the image data D4 is depicted on the liquid crystal panel 1121. FIG. 6 illustrates a case in which the angle of the glass plate 21 is the predetermined angle when the image based on the image data D4 is depicted on the liquid crystal panel 1121. The predetermined angle indicates a case in which the glass plate 21 of the shift device 20 is in the first state or the second state. In a case in which the glass plate 21 is insufficiently inclined or, on the contrary, is excessively inclined when an image is depicted on the liquid crystal panel 1121, the light axis of the image light LL transmitted through the glass plate 21 is deviated from a desirable direction, and thus the effect of high resolution may be diminished.

In FIGS. 5 and 6, target sections and shift effective sections are illustrated. In FIGS. 5 and 6, a section which is disposed between the vertical synchronization signals V2 and is indicated by a dotted line corresponds to the target section. A section which is disposed between the control signals CS and to which a letter "Y" is affixed corresponds to the shift effective section.

The target section indicates a section in which a pixel located near the center of a rectangular pixel region included in the liquid crystal panel 1121 is depicted. For example, the target section is assumed to be a section in which an image is depicted in pixels of a middle region among three regions obtained by vertically dividing the liquid crystal panel 1121.

When the vertical synchronization signal V2 is input and light modulation device driving unit 122 starts depicting the image on the liquid crystal panel 1121, the light modulation device driving unit 122 starts depicting an image from the first line of the top of the rectangular pixel region. A section in which the light modulation device driving unit 122 starting depicting the image from the first line of the top of the pixel region depicts the image in the pixels of the middle region of the three divided regions is the target section.

The shift effective section is a section in which the glass plate 21 of the shift device 20 can be seen to be in the first state or the second state. That is, the shift effective section is a section which is not in a state in which an attitude of the glass plate 21 is excessively inclined or insufficiently inclined. For example, the light axis of the image light LL transmitted through the glass plate 21 in a certain shift effective section and the light axis of the image light LL transmitted through the glass plate 21 in a shift effective section before or after the certain shift effective section can be seen to be in a state in which the light axes are deviated by half of a pixel.

The control signal CS is input from the control unit 170 to the signal processing unit 123.

The signal processing unit 123 outputs the driving signal DS to the shift device 20 at a timing at which the control signal CS is input from the control unit 170. Thus, a timing at which the driving signal DS is input to the shift device 20 is adjusted, and thus the shift effective section is adjusted to be located within the target section.

FIG. 5 illustrates a case in which the shift control unit 175 outputs the control signal CS to the signal processing unit 123 after the vertical synchronization signal V2 is input and a "t1" time elapses. That is, FIG. 5 illustrates a case in which an output timing of the control signal CS is delayed by the "t1" time than the vertical synchronization signal V2. In this case, the shift effective section of the shift device 20 is located before the target section, and a timing at which an image is displayed on the liquid crystal panel 1121 is deviated from a timing at which the shift device 20 enters the first state or the second state. Therefore, display quality of an image to be projected to the screen SC may deteriorate.

FIG. 6 illustrates a case in which the shift control unit 175 outputs the control signal CS to the signal processing unit 123 after the vertical synchronization signal V2 is input and a "t2" time elapses. That is, FIG. 6 illustrates a case in which an output timing of the control signal CS is delayed by the "t2" time than the vertical synchronization signal V2. The delay time "t2" is set to be longer than the delay time "t1". In this case, as illustrated in FIG. 6, the shift effective section of the shift device 20 is within the target section, and a timing at which the shift device 20 enters the first state or second state can match a timing at which an image is displayed on the liquid crystal panel 1121.

It is assumed that a type of image data supplied from the image supply device 300 is changed and a frame rate of an image is changed. In this case, when the signal processing unit 123 operates the shift device 20 at the same timing before and after the change in the frame rate, a problem arises in that the shift effective section of the shift device 20 does not match the target section. When the shift effective section of the shift device 20 does not match the target section, display quality of an image to be projected to the screen SC may deteriorate.

Accordingly, in the embodiment, the shift control unit 175 detects a frequency of the vertical synchronization signal V1 included in the image data D1 and acquires information regarding a delay time corresponding to the detected frequency from the delay time table 165. When the vertical synchronization signal V2 is input from the image processing unit 155, the shift control unit 175 delays the output timing by a delay time acquired from the delay time table 165 than the input of the vertical synchronization signal V2 and outputs the control signal CS to the signal processing unit 123. Accordingly, the attitude of the shift device 20 can be in the first state or the second state within the target section, and thus it is possible to prevent the display quality of an image to be projected from deteriorating.

The shift control unit 175 determines whether the detected frequency of the vertical synchronization signal is identical to a preset frame frequency. The preset frame frequency is, for example, a preset frequency, such as 60 Hz, 50 Hz, 48 Hz, or 24 Hz, which can be displayed by the projector 100.

For example, it is assumed that the image processing unit 155 converts the image data D1 in which the frequency of the vertical synchronization signal V1 is 60 Hz into the image data D4 in which the frequency is 120 Hz and the display unit 110 displays an image based on the image data D4 at a frame rate of 120 Hz.

The shift control unit 175 detects a frequency of the vertical synchronization signal V1 input from the I/F unit 151 and determines whether the detected frequency is identical to 60 Hz. That is, the shift control unit 175 determines whether the detected frequency of the vertical synchronization signal V1 varies to, for example, 59.9 Hz, 60.1 Hz, or 60.2 Hz. The shift control unit 175 compares an input timing of the vertical synchronization signal V1 from the I/F unit 151 to a system clock and determines whether the frequency of the vertical synchronization signal varies.

In a case in which the shift control unit 175 determines whether the detected frequency of the vertical synchronization signal varies, the shift control unit 175 corrects the information regarding the delay time acquired from the delay time table 165. The shift control unit 175 calculates a correction value based on a difference between the preset frequency such as 60 Hz or 50 Hz and the frequency detected from the vertical synchronization signal V1 input from the I/F unit 151 and corrects the delay time acquired from the delay time table 165 in accordance with the calculated correction value.

For example, in a case in which the detected frequency is less than the preset frequency, the shift control unit 175 increases the delay time and calculates a correction value for latening the output timing of the driving signal DS. Conversely, in a case in which the detected frequency is greater than the preset frequency, the shift control unit 175 decreases the delay time and calculates a correction value for advancing the output timing of the driving signal DS.

The delay time corrected based on the correction value is referred to as a corrected delay time. The shift control unit 175 changes the output timing at which the control signal CS is output to the signal processing unit 123 based on the information regarding a corrected delay time.

Depending on characteristics of the shift device 20, the output timing of the driving signal DS is configured to be advanced by decreasing the delay time in some cases in which the detected frequency is less than the preset frequency. Depending on the characteristics of the shift device 20, the output timing of the driving signal DS is configured to be latened by increasing the delay time in some cases in which the detected frequency is greater than the preset frequency.

The shift control unit 175 changes the current value of the driving signal DS output to the shift device 20 by the signal processing unit 123 according to the frequency of the vertical synchronization signal V1 input from the I/F unit 151. The shift control unit 175 detects the frequency of the vertical synchronization signal V1, generates the control signal CS including information for designating a current value corresponding to the detected frequency, and outputs the control signal CS to the signal processing unit 123.

For example, the shift control unit 175 causes a current value of the driving signal DS in a case in which the frequency of the vertical synchronization signal V1 included in the image data D1 is 50 Hz to be less than a current value of the driving signal DS in a case in which the frequency of the vertical synchronization signal V1 included in the image data D1 is 60 Hz. Further, the shift control unit 175 causes a current value of the driving signal DS in a case in which the frequency of the vertical synchronization signal V1 included in the image data D1 is 48 Hz to be less than a current value of the driving signal DS in a case in which the frequency of the vertical synchronization signal V1 included in the image data D1 is 50 Hz. A case in which the frequency of the vertical synchronization signal V1 is 50 Hz is equivalent to a "preset frequency" according to the invention.

By changing the current value of the driving signal DS, it is possible to change a time taken until the amplitude of the movable unit 22 becomes a target amplitude according to the frequency of the image data D1.

A frequency component of the driving signal DS which is an alternating current includes a frequency component of multiplication of a basic frequency such as 48 Hz, 50 Hz, or 60 Hz. For example, in a case in which the basic frequency is 50 Hz, the driving signal DS includes a frequency component (harmonic component) of multiplication such as 100 Hz or 150 Hz. When the harmonic component of the driving signal DS is identical to a resonance frequency of the shift device 20, the amplitude of the shift device 20 is changed considerably more than an intended amplitude.

Figure 7:
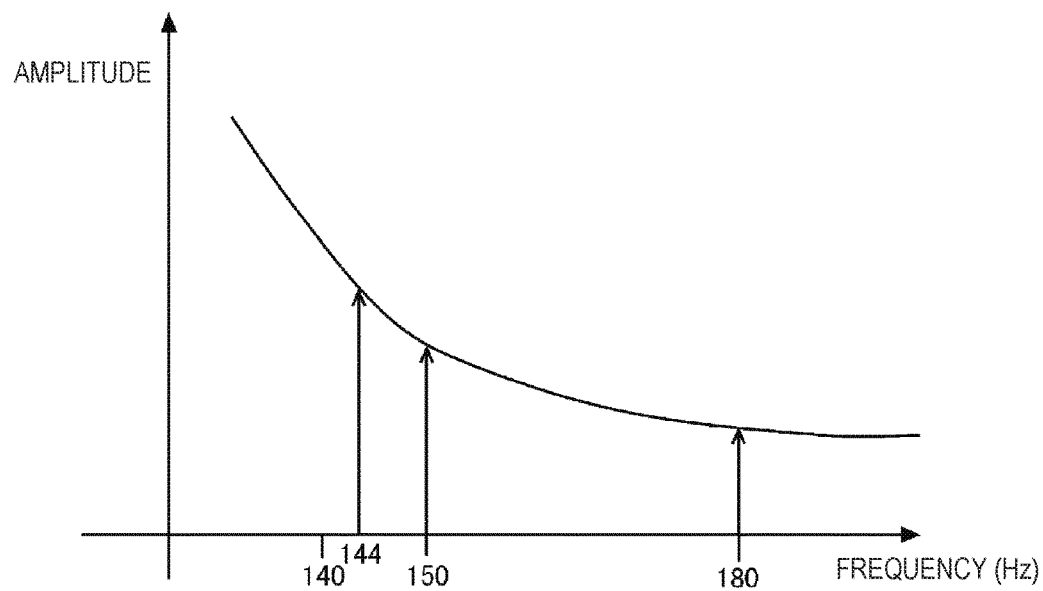
FIG. 7 is a diagram illustrating a relation between a frequency of a driving signal and an amplitude of a shift device.

FIG. 7 is a diagram illustrating a relation between the frequency of the driving signal DS and the amplitude of the shift device 20. In particular, FIG. 7 illustrates the relation between a triple frequency (144 Hz, 150 Hz, or 180 Hz) of the basic frequency 48 Hz, 50 Hz, or 60 Hz and the amplitude of the shift device 20. As apparent with reference to FIG. 7, the amplitude of the shift device 20 increases as the frequency decreases. Therefore, according to the embodiment, the current value of the driving signal DS in a case in which the frequency of the vertical synchronization signal V1 is 50 Hz is set to be less than the current value of the driving signal DS in a case in which the frequency of the vertical synchronization signal V1 is 60 Hz. Further, the current value of the driving signal DS in a case in which the frequency of the vertical synchronization signal V1 is 48 Hz is set to be less than the current value of the driving signal DS in a case in which the frequency of the vertical synchronization signal V1 is 50 Hz.

The relation between the frequency of the driving signal DS and the amplitude of the shift device 20, as illustrated in FIG. 7, is merely an example. Depending on the shift device 20, the amplitude is constant regardless of the frequency of the driving signal DS in some cases. In such a case, the current value of the driving signal DS may not be changed according to the frequency of the vertical synchronization signal V1.

Next, the shift device 20 incorporated in the projector 100 will be described.

Figure 8:
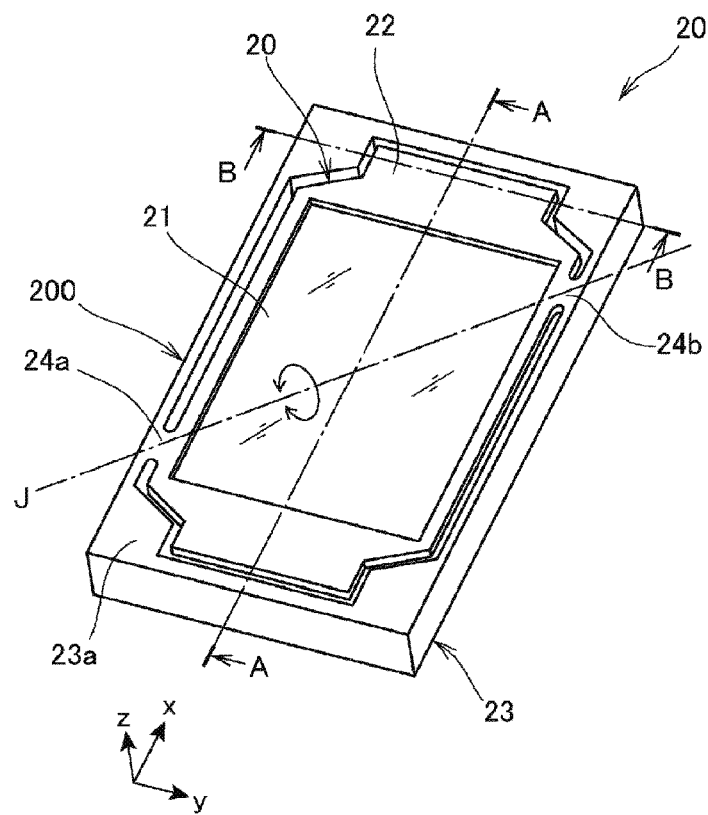
FIG. 8 is a diagram illustrating a shift device included in the projector.
Figure 9:
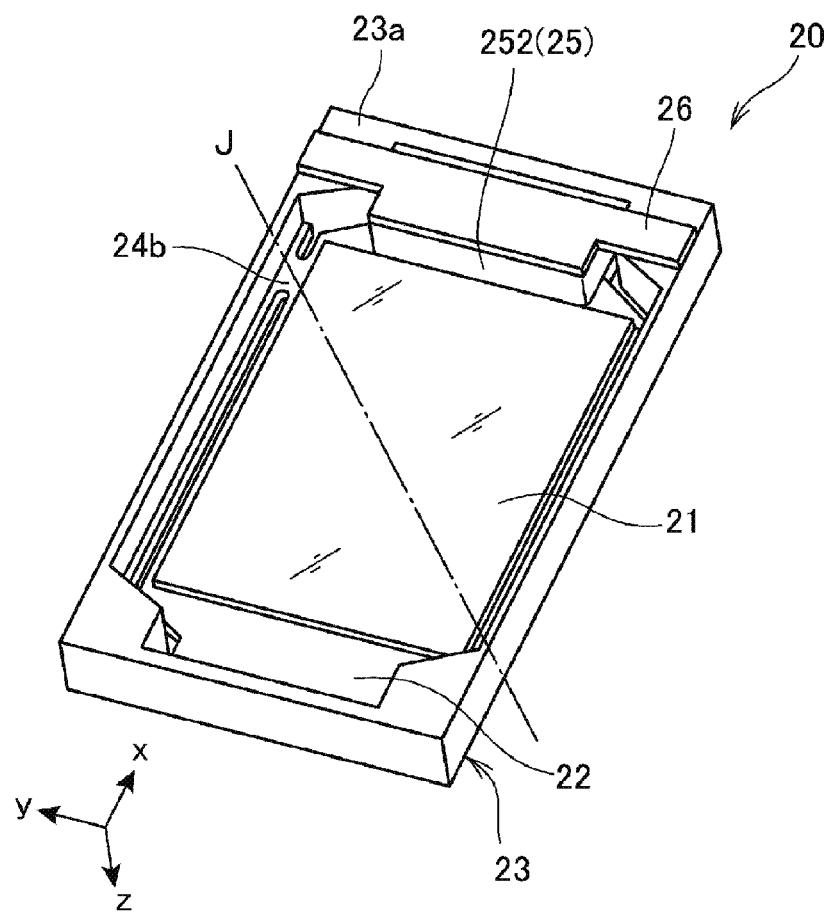
FIG. 9 is a diagram illustrating the shift device included in the projector.

FIGS. 8 and 9 are diagrams illustrating the shift device 20 included in the projector 100. In particular, FIG. 8 is a top perspective view illustrating the shift device 20 and FIG. 9 is a rear perspective view illustrating the shift device 20.

Figure 10:
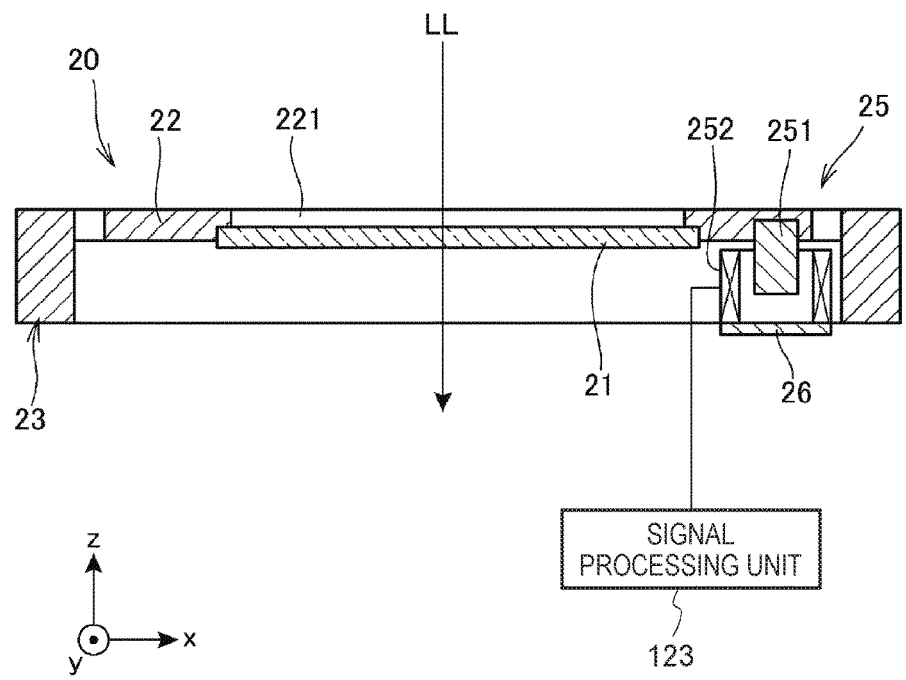
FIG. 10 is a sectional view illustrating the shift device included in the projector.
Figure 11:
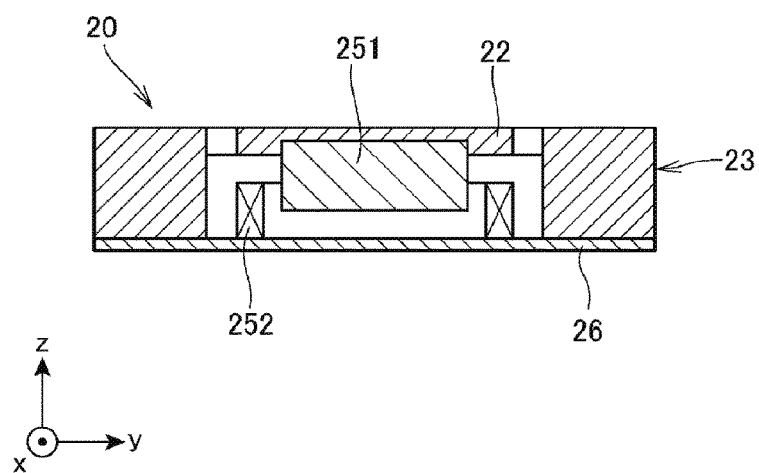
FIG. 11 is a sectional view illustrating the shift device included in the projector.

FIGS. 10 and 11 are sectional views illustrating the shift device 20. In particular, FIG. 10 is a sectional view taken along the line A-A illustrated in FIG. 8 and FIG. 11 is a sectional view taken along the line B-B illustrated in FIG. 8.

In FIGS. 8 to 11, to facilitate the description, x, y, and z axes are appropriately illustrated as three axes perpendicular to each other, the front end side of the illustrated arrow is assumed to be a "+side", and the base end side is assumed to be a "−side". Hereinafter, the direction parallel to the x axis is called an "x axis direction", the direction parallel to the y axis is called a "y axis direction", the direction parallel to the z axis is called a "z axis direction", the +z side is called an "upper", and the −z side is called a "lower".

The shift device 20 includes the glass plate 21 that has light transparency and deflects the image light LL, the movable unit 22 that holds the glass plate 21, a support unit 23 that supports the movable unit 22 to be pivotable, and a driving mechanism (actuator) 25 that pivots the movable unit 22 with respect to the support unit 23.

For example, the shift device 20 is disposed inside the projector 100 so that the +z side is oriented on the side of the dichroic prism 109 and the −z side is oriented on the side of the projection optical system 114.

The glass plate 21 has a substantially rectangular shape in a plan view and is disposed so that the longitudinal direction of the glass plate 21 is substantially parallel to the x axis direction. The glass plate 21 can transmit the incident image light LL while refracting the image light LL when its attitude is changed, that is, an incident angle of the image light LL is changed. Accordingly, by changing the attitude of the glass plate 21 so that the attitude is a target incidence angle, it is possible to control a deflection direction or a deflection amount of the image light LL. The size of the glass plate 21 is set appropriately so that the image light LL emitted from the dichroic prism 109 can be transmitted. The glass plate 21 is preferably substantially colorless and transparent. An antireflection film may be formed on the incidence surface and the emission surface of the image light LL of the glass plate 21.

As a material of the glass plate 21, for example, any of various glass materials such as super white glass, borosilicate glass, and quartz glass can be used. In the embodiment, the glass plate 21 is used as an optical member. However, the optical member is not particularly limited as long as the optical member is formed of a material having light transparency. For example, the optical member may be formed of crystal, any of various crystalline materials such as sapphire, or any of various resin materials such as a polycarbonate-based resin and an acrylic resin. Here, the glass plate 21 in the embodiment is preferably used as the optical member. Thus, since rigidity of the glass plate 21 can be particularly large, it is possible to particularly suppress deflection irregularity of light deflected in the glass plate 21.

The movable unit 22 is formed in a flat plate shape and has a through hole 221 in its middle. The glass plate 21 is fitted in the through hole 221. For example, the glass plate 21 is adhered to the movable unit 22 by an adhesive. The through hole 221 has a stepped portion in its circumference and receives the glass plate 21 is received by the stepped portion. Thus, the glass plate 21 is simply disposed in the movable unit 22.

The support unit 23 includes a rectangular frame 23a surrounding the circumference of the movable unit 22 and a pair of axial portions 24a and 24b connecting the movable unit 22 and the frame 23a in a pair of corners of the rectangular glass plate 21 facing each other. Thus, the support unit 23 can support the movable unit 22 to be pivotable with reference a pivot axis J connecting the one pair of axial portions 24a and 24b.

The axial portions 24a and 24b are formed at positions deviated in the x axis direction and the y axis direction in a plan view. The pivot axis J is set as an axis inclined about 45° with respect to both of the x and y axes. Accordingly, the movable unit 22 can be pivoted so that a deflection direction of the image light LL by the glass plate 21 held by the movable unit 22 can be equally shifted in both of the x axis direction and the y axis direction. In the shift device 20, the axial portions 24a and 24b are disposed at points symmetric with respect to the center of the glass plate 21 in a plan view, and therefore pivot balance of the movable unit (the glass plate 21) is good.

The movable unit 22, the support unit 23, and the axial portions 24a and 24b are integrated. Thus, shock resistance or long-term durability is improved in boundaries of the support unit 23 and the axial portions 24a and 24b or boundaries of the axial portions 24a and 24b and the movable unit 22.

The movable unit 22, the support unit 23, and the axial portions 24a and 24b are formed of a material with a smaller Young's modulus than the material of the glass plate 21. The material of the movable unit 22, the support unit 23, and the axial portions 24a and 24b preferably contains and more preferably contain a resin as a main component. Thus, stress occurring in association with pivot of the movable unit 22 can be efficiently prevented from leading to unnecessary vibration of the glass plate 21.

By surrounding the side surface of the glass plate 21 with the movable unit 22 with a relatively small Young's modulus, it is possible to suppress stress occurring in the glass plate 21 as much as possible at the time of changing the attitude of the glass plate 21 and suppress unnecessary vibration occurring in the glass plate 21 in association with a stress distribution as much as possible. As a result, it is possible to prevent an image deflected by the glass plate 21 from being deflected in an unintended direction.

As a resin usable as the material of the movable unit 22, the support unit 23, and the axial portions 24a and 24b, for example, polyethylene, polypropylene, silicone, polyacetal, polyamide, polycarbonate, polyphenylene ether, polyethylene terephthalate, polybutylene terephthalate, polyalylate, polysulphone, polyethersulfone, polyphenylenesulfide, polyetheretherketone, polyimide, polyetherimide, or a fluorocarbon resin can be used. Further, a resin containing at least one kind of resin of these materials can be used.

Next, the driving mechanism 25 that pivots the movable unit 22 will be described.

The driving mechanism 25 includes a permanent magnet 251 and a coil 252. The driving mechanism 25 operates as an electronic actuator that generates an electromagnetic force by flowing the driving signal DS of the alternating current output from the signal processing unit 123 in the coil 252. By using the electronic actuator as the driving mechanism 25, it is possible to generating a force sufficient to pivot the movable unit 22, and thus it is possible to smoothly pivot the movable unit 22.

The permanent magnet 251 is installed in an edge of the movable unit 22 and has a rectangular shape in the y axis direction. The permanent magnet 251 is magnetized in the z axis direction (the thickness direction of the movable unit 22). As the permanent magnet 251, for example, a neodymium magnet, a ferrite magnet, a samarium cobalt magnet, or an alnico magnet can be used, but the invention is not limited thereto.

The coil 252 is fixed to the support unit 23 to face the permanent magnet 251 in the z axis direction with the holding member 26 interposed therebetween. The coil 252 is a cylindrical air core coil and a part of the permanent magnet 251 is inserted inside the coil 252. Thus, it is possible to efficiently apply a magnetic field generated from the coil 252 to the permanent magnet.

The low profile of the shift device 20 can be achieved. The permanent magnet 251 and the coil 252 may be disposed with a predetermined gap therebetween in the z axis direction. In this case, a wiring may be wound around the coil 252 up to the vicinity of the center of the coil 252.

The disposition of the coil 252 is not particularly limited as long as the coil 252 is disposed within a range in which the magnetic field is applied to the permanent magnet 251. In the embodiment, the so-called "moving magnet type" driving mechanism 25 in which the permanent magnet 251 is disposed in the movable unit 22 is used, but the disposition of the permanent magnet 251 and the coil 252 may be reversed.

That is, the so-called "moving coil type" driving mechanism 25 in which the coil 252 is disposed in the movable unit 22 may be used. Here, when the "moving magnet type" driving mechanism 25 in the embodiment is used, heat of the coil 252 generated by electric conduction is rarely transmitted to the movable unit 22 or the glass plate 21. Further, it is possible to efficiently suppress a change in vibration characteristics (a change in a resonance frequency) by the heat or bending of the glass plate 21.

Figure 12:
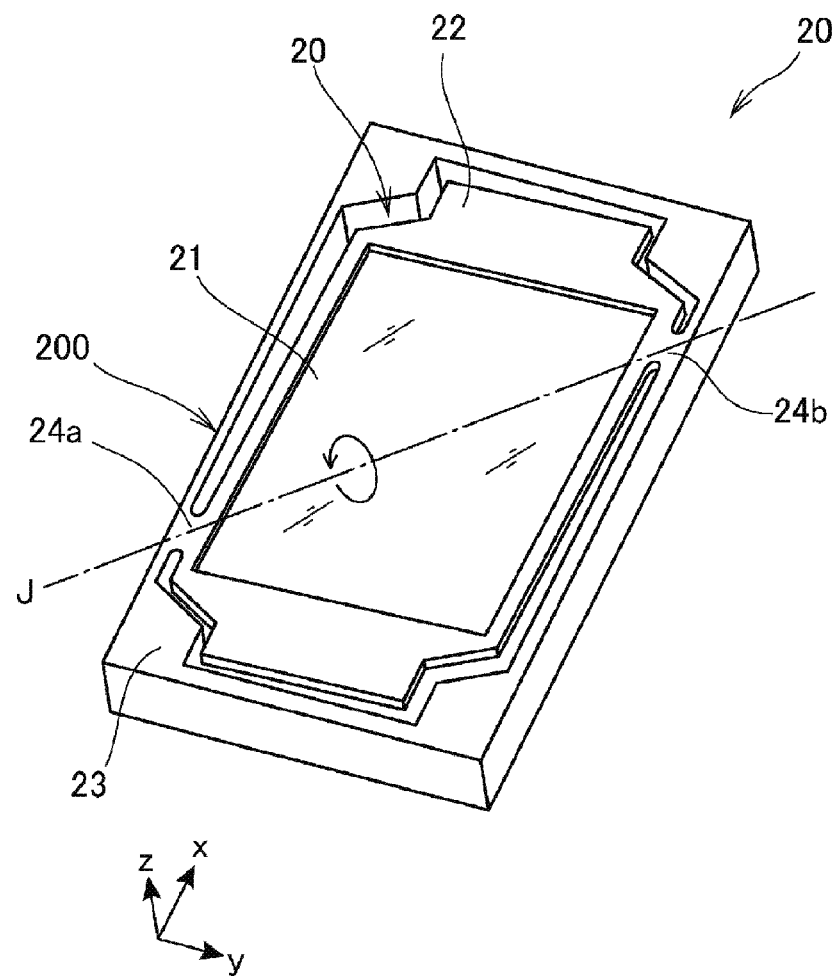
FIG. 12 is a perspective view illustrating main units that show an operation state of a movable unit.
Figure 13:
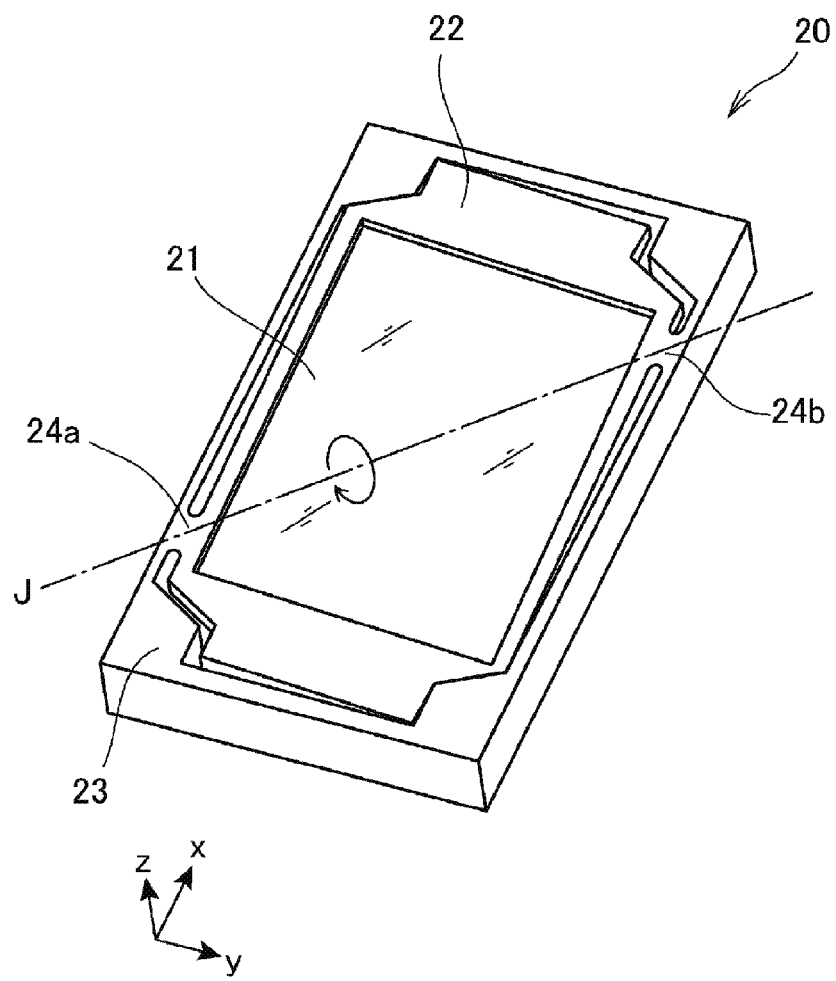
FIG. 13 is a perspective view illustrating the main units that show an operation state of the movable unit.

FIGS. 12 and 13 are perspective views illustrating main units that show operation states of the movable unit 22.

FIG. 12 illustrates a case in which the movable unit 22 is pivoted on one side and enters the first state. FIG. 13 illustrates a case in which the movable unit 22 is pivoted on the other side and enters the second state.

The driving mechanism 25 having the configuration pivots the movable unit 22 as follows.

In a case in which the driving signal DS does not flow from the signal processing unit 123 to the coil 252, the movable unit 22 is substantially parallel to the xy plane. When the driving signal DS of the alternating current is supplied to the coil 252 by the signal processing unit 123 and the direction of the driving signal DS flowing the coil 252 is changed, the movable unit 22 is pivoted (rotated) about the pivot axis J with respect to the support unit 23. Thus, the movable unit 22 is repeated between the state illustrated in FIG. 12 and the state illustrated in FIG. 13. Then, the light axis of the image light LL is shifted by the pivot of the movable unit 22, as illustrated in FIG. 3, an image is alternately displayed at the first display position P1 and the second display position P2. Accordingly, the number of apparent pixels increases, and thus high resolution of the image is achieved.

The frequency of the driving signal DS differs according to a frame rate (the number of images per second) of the projector 100. For example, the frequency of the driving signal DS is assumed to be 60 Hz in a case in which the frame rate is 120 fps.

Figure 14:
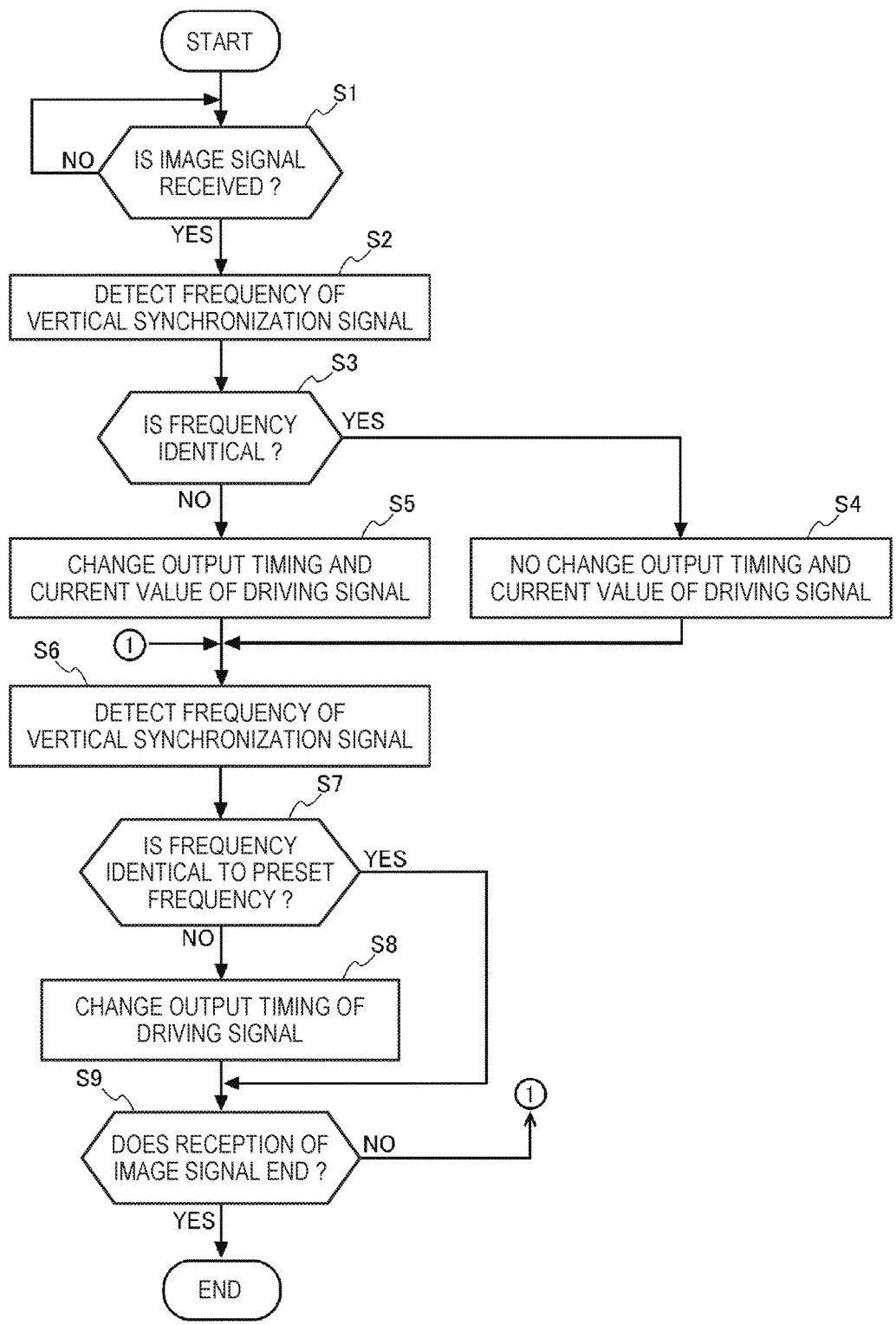
FIG. 14 is a flowchart illustrating an operation of a projector according to a first embodiment.

FIG. 14 is a flowchart illustrating an operation of the projector 100 according to the first embodiment.

When no image signal is supplied from the image supply device 300 (NO in step S1), the projector 100 waits until supply of an image signal starts.

When the supply of an image signal from the image supply device 300 starts (YES in step S1), the I/F unit 151 converts the input image signal into the image data D1 and outputs the image data D1 to the image processing unit 155. Then, the I/F unit 151 extracts a synchronization signal from the image signal and outputs the synchronization signal to the control unit 170.

The shift control unit 175 detects the frequency of the vertical synchronization signal V1 in the synchronization signal input from the I/F unit 151 (step S2).

The shift control unit 175 determines whether the detected frequency of the vertical synchronization signal V1 is identical to the frequency of the vertical synchronization signal V1 acquired from a previously received image signal (step S3).

When the determination result is positive (YES in step S3), the shift control unit 175 generates the control signal CS including the same setting as setting of the driving current set at the time of previously receiving the image signal. Then, the shift control unit 175 outputs the control signal CS to the signal processing unit 123 at the same output timing as the time of previously receiving the image signal. Thus, the signal processing unit 123 outputs the driving signal DS to the shift device 20 at the same output timing as the time of previously receiving the image signal (step S4). The signal processing unit 123 outputs the driving signal DS with the same current value as the time of previously receiving the image signal (step S4) to the shift device 20.

Conversely, when the determination result is negative (NO in step S3), the shift control unit 175 acquires the information regarding the delay time corresponding to the detected frequency of the vertical synchronization signal V1 from the delay time table 165. The shift control unit 175 generates the control signal CS including the setting of the driving current corresponding to the detected frequency of the vertical synchronization signal V1. Then, when the vertical synchronization signal V2 is input from the image processing unit 155, the shift control unit 175 outputs the control signal CS to the signal processing unit 123 after the acquired delay time elapses from the input from the vertical synchronization signal V2. Thus, the output timing at which the signal processing unit 123 outputs the driving signal DS to the shift device 20 is changed to a timing corresponding to the frequency of the image data D1 (step S5). Further, the current value of the driving signal DS output by the signal processing unit 123 is changed to a current value corresponding to the frequency of the image data D1 (step S5).

The image processing unit 155 writes the image data D1 input from the I/F unit 151 on the frame memory 157 and performs the contrast adjustment process, the luminance adjustment process, and the like on the written image data D1 to generate the image data D2.

The image processing unit 155 generates an interpolation frame based on the image data D2 read from the frame memory 157 and outputs the image data D3 at a double frame rate of the frame rate of the image data D2. Further, the image processing unit 155 generates the vertical synchronization signal V2 corresponding to the converted frame rate. The image processing unit 155 outputs the generated vertical synchronization signal V2 to the control unit 170. The image processing unit 155 performs various processes such as a resolution conversion process and a luminance correction process on the image data D3 and outputs the processed image data D4 to the light modulation device driving unit 122 along with the vertical synchronization signal V2.

When the control signal CS is input from the shift control unit 175, the signal processing unit 123 outputs the driving signal DS to the shift device 20. Thus, the attitude of the shift device 20 enters the first state or the second state within the target section. The signal processing unit 123 adjusts the current value of the driving signal DS according to the setting of the current value included in the control signal CS. Thus, the amplitude of the shift device 20 can be controlled to an optimum amplitude so that the amplitude of the shift device 20 is not changed considerably than the intended amplitude. A time taken until the amplitude of the movable unit 22 becomes a target amplitude can be changed according to the frequency of the image data D1.

Next, the shift control unit 175 detects the frequency of the vertical synchronization signal V1 continuously input from the I/F unit 151 (step S6). Then, the shift control unit 175 determines whether the detected frequency is identical to a preset frequency (step S7). The shift control unit 175 compares the detected frequency to the closest frequency to the detected frequency among the preset frequencies and determines whether both of the frequencies are identical to each other. When the shift control unit 175 determines that the detected frequency is identical to the preset frequency (YES in step S7), the shift control unit 175 determines whether the reception of the image signal from the image supply device 300 ends (step S9). When the determination result is negative (NO in step S9), the process returns to step S6 and the shift control unit 175 repeats the processes of steps S6 to S9. Conversely, when the determination result is positive (YES in step S9), the shift control unit 175 ends the process flow.

Conversely, when the shift control unit 175 determines that the detected frequency is not identical to the preset frequency (NO in step S7), the shift control unit 175 detects a difference between the detected frequency and the preset frequency and calculates a correction value for correcting the delay time based on the detected difference. The shift control unit 175 corrects the delay time in accordance with the calculated correction value to generate the corrected delay time. Based on the generated corrected delay time, the shift control unit 175 changes the output timing at which the control signal CS is output to the signal processing unit 123. The signal processing unit 123 outputs the driving signal DS to the shift device 20 in accordance with the input timing of the control signal CS, and thus the timing at which the attitude of the glass plate 21 is changed by the shift device 20 is corrected (step S8). Thus, the timing at which the attitude of the shift device 20 can be changed to correspond to the change in the frequency of the vertical synchronization signal V1.

In step S5 of the above-described flowchart, the case has been described in which the signal processing unit 123 changes both of the output timing at which the driving signal DS is output to the shift device 20 and the current value of the driving signal DS. As a modification example of step S5, the signal processing unit 123 may operate so that only the output timing of the driving signal DS to the shift device 20 may be changed.

As described above, the projector 100 according to the first embodiment to which a projector and a method of controlling the projector according to the invention are applied includes the I/F unit 151, the display unit 110, the shift device 20, the signal processing unit 123, and the shift control unit 175.

The I/F unit 151 inputs an image signal supplied from the image supply device 300.

The display unit 110 displays an image based on the image signal input by the I/F unit 151 on the screen SC.

The shift device 20 changes a display position of the image display by the display unit 110.

The signal processing unit 123 outputs the driving signal DS to the shift device 20 and drives the shift device 20.

The shift control unit 175 controls the driving signal DS output by the signal processing unit 123. The shift control unit 175 changes an output timing of the driving signal DS to correspond to a change in a frequency of the image data D1 converted from the image signal.

Accordingly, a timing at which the display position of the image is changed by the shift device 20 can match a timing at which the image displayed by the display unit 110 is changed. Therefore, a high-quality image can be displayed on the screen SC.

The projector 100 according to the first embodiment includes the storage unit 160. The storage unit 160 stores the delay time table 165 in which the frequency of the image data D1 and the output timing of the driving signal DS are matched and registered.

The shift control unit 175 acquires the output timing corresponding to the frequency of the image data D1 from the delay time table 165 and outputs the driving signal DS to the signal processing unit 123 at the acquired output timing. The shift control unit 175 sets the delay time of the output timing of the driving signal DS with respect to the vertical synchronization signal V2 of the image data D4.

Accordingly, the timing at which the shift device 20 changes the display position of the image can be easily matched to the timing at which the image display by the display unit 110 is switched.

The shift control unit 175 changes the output timing of the driving signal DS in a case in which the frequency of the image data D1 is different from the preset frequency such as 60 Hz, 50 Hz, 48 Hz, or 24 Hz.

Specifically, the shift control unit 175 calculates a correction value for correcting the output timing of the driving signal DS in a case in which the detected frequency of the image data D1 is different from the preset frequency such as 60 Hz, 50 Hz, 48 Hz, or 24 Hz. Then, the shift control unit 175 corrects the information regarding the delay time acquired from the delay time table 165 based on the calculated correction value and outputs the corrected information regarding the delay time to the signal processing unit 123.

Accordingly, the timing at which the display position of the image is changed by the shift device 20 can be changed to correspond to the change in the frequency of the image data D1.

In a case in which the detected frequency is less than the preset frequency, the shift control unit 175 increases the delay time and calculates a correction value for latening the output timing of the driving signal DS.

In a case in which the detected frequency is greater than the preset frequency, the shift control unit 175 decreases the delay time and calculates a correction value for advancing the output timing of the driving signal DS.

Accordingly, the timing at which the shift device 20 changes the display position of the image can be changed to correspond to the change in the frequency of the image data D1.

The shift device 20 includes the glass plate 21, the movable unit 22 that holds the glass plate 21, and the driving mechanism 25 that pivots the movable unit 22.

The shift control unit 175 changes a current value of an alternating current to be supplied as the driving signal DS to the shift device 20 according to the frequency of the image data D1.

Accordingly, a time taken until the amplitude of the movable unit 22 becomes a target amplitude can be changed according to the frequency of the image data D1.

When the frequency component of multiplication of the basic frequency included in the driving signal DS is identical to the resonance frequency of the shift device 20, the amplitude of the shift device 20 may by changed considerably more than an intended amplitude. Accordingly, by changing the current value of the driving signal DS according to the frequency of the image data D1, it is possible to prevent the amplitude of the shift device 20 from being changed considerably more than the intended amplitude, and the amplitude of the shift device 20 can become the target amplitude regardless of the frequency of the image data D1.

In a case in which the frequency of the image data D1 is a frequency such as 60 Hz higher than 50 Hz which is the preset frequency, the shift control unit 175 increases the current value of the driving current to be supplied to the shift device 20. In a case in which the frequency of the image data D1 is a frequency such as 24 Hz lower than 50 Hz which is the preset frequency, the shift control unit 175 decreases the current value of the driving current to be supplied to the shift device 20.

Accordingly, the amplitude of the shift device 20 can become the target amplitude regardless of the frequency of the image data D1.

Second Embodiment

Next, a second embodiment of the invention will be described with reference to the appended drawings.

The configuration according to the second embodiment is the same as the configuration according to the above-described first embodiment. Therefore, the description of the configuration according to the second embodiment will be omitted.

The projector 100 is normally used at two attitudes, a stationary attitude at which the projector 100 is placed on a pedestal and a suspended attitude at which the projector 100 is suspended from a ceiling to be used in a state in which the stationary attitude is vertically inverted. In the case of the stationary attitude, the pedestal on which the projector 100 is placed is not horizontal, but the projector 100 placed on the pedestal is inclined in some cases. In a case in which an image projected by the projector 100 is not on the screen SC, the body of the projector 100 is inclined so that the projected image is within the range of the screen SC in some cases. Even in the case of the suspended attitude, the body of the projector 100 is installed so that the projector 100 is inclined not to be horizontal depending on a use environment of the user in some cases.

When the body of the projector 100 is installed at an inclined attitude, the attitude of the shift device 20 is affected by the body of the projector 100. Thus, when the movable unit 22 of the shift device 20 is pivoted, the glass plate 21 is excessively inclined or insufficiently inclined in at least one of the first state and the second state in some cases.

Therefore, the shift control unit 175 according to the embodiment inputs attitude information detected by the attitude detection unit 137 and sets a duty ratio of the driving signal DS based on the input attitude information.

The attitude detection unit 137 detects a roll, pitch, and yaw angles to detect an attitude of the body of the projector 100. The attitude detection unit 137 outputs information regarding the detected angles as attitude information to the control unit 170.

The shift control unit 175 adjusts the duty ratio of the driving signal DS output by the signal processing unit 123 based on the input attitude information.

FIG. 15 is a diagram illustrating an attitude of the shift device 20 in a case in which the projector 100 is installed at an inclined attitude. FIG. 16 is a diagram illustrating an attitude of the shift device 20 after the waveform of the driving signal DS is modified.

FIG. 15 illustrates a waveform of the driving signal DS output from the signal processing unit 123 to the shift device 20 and an attitude of the shift device 20 in a case in which the projector 100 is installed at an inclined attitude.

In FIG. 15, an attitude of the shift device 20 is indicated by a solid line in a case in which the projector 100 is installed at an inclined attitude. An attitude of the shift device 20 is indicated by a dotted line in a case in which the projector is installed horizontally. One period of the driving signal DS includes two sections, sections A and B. The driving signal DS which is an alternating current flows in a first direction of the coil 252 in the section A and flows in a second direction of the coil 252 opposite to the first direction in the section B. In FIG. 15, the length of the section A is set to be the same as the length of the section B.

In the description of FIGS. 15 and 16, an attitude of the shift device 20 in the section A is referred to as a first state and an attitude of the shift device 20 in the section B is referred to as a second state.

At the attitude of the shift device 20 illustrated in FIG. 15, the shift device 20 is insufficiently inclined in the first state and the shift device 20 is excessively inclined in the second state.

FIG. 16 illustrates a waveform of the driving signal DS and an attitude of the shift device 20 in a case in which the waveform of the driving signal DS is changed in the projector 100 at the same attitude as that of FIG. 15.

In FIG. 16, the lengths of the sections A and B are changed so that the length of the section A is longer than the length of the section B. In FIG. 15, the shift device 20 is insufficiently inclined in the section A and the shift device 20 is excessively inclined in the section B due to the influence of inclination of the body of the projector 100. Therefore, the shift control unit 175 controls the signal processing unit 123 based on the attitude information input from the attitude detection unit 137 and causes the length of the section A in which the driving signal DS which is an alternating current flows in the first direction of the coil 252 to be longer than the length of the section B in which the driving signal DS flows in the second direction of the coil 252. Thus, in the section A, the insufficiently inclined shift device 20 is adjusted to be further inclined. In the section B, the excessively inclined shift device 20 is adjusted to be less inclined.

Figure 17:
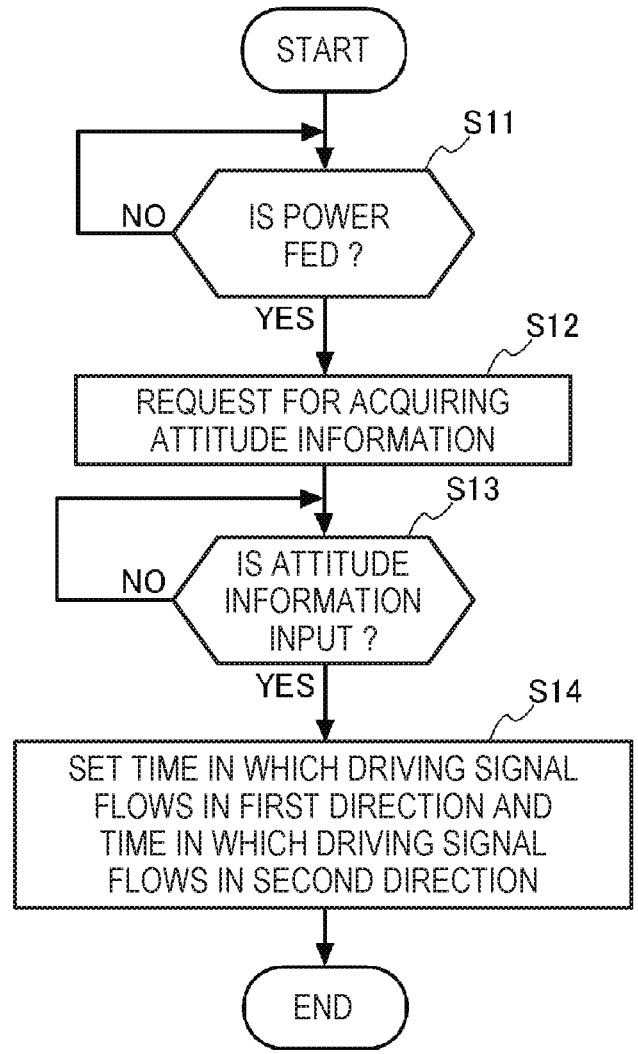
FIG. 17 is a flowchart illustrating an operation of a projector according to a second embodiment.

An operation of the projector according to the second embodiment will be described with reference to the flowchart of FIG. 17. In the flow illustrated in FIG. 17, the projector 100 starts a process immediately after power is fed to the projector 100. However, when a user manipulation is received by the remote controller 5 or the manipulation panel 131, the projector 100 may start a process.

When power is fed to the projector 100 (YES in step S11), the shift control unit 175 outputs a request for acquiring the attitude information to the attitude detection unit 137 (step S12). In a case in which no attitude information is input (NO in step S13), the shift control unit 175 waits until the attitude information is input from the attitude detection unit 137. When the attitude information is input (YES in step S13), the shift control unit 175 sets a time in which the driving signal DS flows in the first direction of the coil 252 and a time in which the driving signal DS flows in the second direction of the coil 252 based on the input attitude information (step S14). The set time information is stored in the storage unit 160. When supply of the image signal from the image supply device 300 starts, the shift control unit 175 reads the time information from the storage unit 160 and generates setting information in which the signal waveform of the driving signal DS is set based on the read time information. The shift control unit 175 generates the control signal CS including the generated setting information and outputs the control signal CS to the signal processing unit 123 in accordance with the output timing of the driving signal DS.

As described above, in the projector 100 according to the second embodiment to which a projector and a method of controlling the projector according to the invention are applied, the attitude detection unit 137 detects an attitude of the projector 100.

The shift device 20 includes the glass plate 21 held to be pivotable and changes the display position of the image displayed by the display unit 110 to the first display position P1 and the second display position P2 according to the attitude of the glass plate 21.

The shift control unit 175 sets the waveform of the driving signal DS output by the signal processing unit 123 according to the attitude of the projector 100 detected by the attitude detection unit 137.

Accordingly, by adjusting the waveform of the driving signal, it is possible to control a change in the attitude of the glass plate 21 serving as an optical member. Therefore, it is possible to appropriately display an image at the first display position P1 and the second display position P2.

The shift device 20 includes the movable unit 22 holding the glass plate 21 and the driving mechanism 25 pivoting the movable unit 22. Accordingly, the movable unit 22 holding the glass plate 21 can be pivoted by the driving mechanism 25.

The above-described embodiments are preferred embodiments of the invention. However, the invention is not limited thereto and can be modified in various forms within the scope of the invention without departing from the gist of the invention.

For example, in the above-described first and second embodiments, the case has been described in which a shift amount of the shift device 20 is equivalent to half of a pixel and high resolution is achieved. However, the shift amount is not limited to half of a pixel. When a shift amount of the first display position P1 and the second display position P2 illustrated in FIG. 3 is set to a regulation amount less than one pixel, the number of apparent pixels can increase and the high resolution can be achieved. For example, the shift amount may be set to ¼ of one pixel or may be set to ⅛ of one pixel.

In the above-described first embodiment, the configuration has been described in which the shift control unit 175 acquires the information regarding the delay time corresponding to the frequency of the vertical synchronization signal V1 input from the I/F unit 151 from the delay time table 165.

As another configuration, the shift control unit 175 may calculate a delay time so that the shift effective section of the shift device 20 is within the target section based on the vertical synchronization signal V1 input from the I/F unit 151 and the vertical synchronization signal V2 input from the image processing unit 155.

In the above-described first and second embodiments, the case has been described in which the shift device 20 is used as an image displacement unit, but a configuration other than the shift device 20 may be used. The case has been described in which the glass plate 21 is used as an optical member having a light incidence surface on which image light is incident, but the invention is not limited to the glass plate 21 and a mirror having a light reflection property may be used. In this case, the optical device according to the invention can be used as an optical device for light scanning, a light switch, a light actuator, or the like.

In the above-described first and second embodiments, the configuration has been exemplified in which three transmissive liquid crystal panels corresponding to R, G, and B colors are used as the light modulation device 112 modulating light emitted from the light source, but the invention is not limited thereto. For example, three reflective liquid crystal panels may be used or a mode in which one liquid crystal panel and a color wheel are combined may be used. Alternatively, a mode in which three digital mirror devices (DMD) are used or a DMD mode in which one digital mirror device and a color wheel is combined may be used. In a case in which only one liquid crystal panel or a DMD are used as a light modulation device, a member equivalent to a combination optical system such as a cross dichroic prism is not necessary. A light modulation device capable of modulating light emitted from a light source can be adopted without problem as well as the liquid crystal panel and the DMD. A reflective liquid crystal display element such as a liquid crystal on silicon (LCOS) (where LCOS is a registered trademark) may be used as the light modulation device 112.

In the above-described embodiments, the front projection type projector 100 that projects an image to the front side of the screen SC has been described as the projector 100, but the invention is not limited thereto.

Each functional unit illustrated in FIG. 1 has a functional configuration and a specific mounting form is not particularly limited. That is, hardware separately corresponding to each functional unit may not necessarily be mounted. Functions of a plurality of functional units can also, of course, be realized when one processor executes a program. In the foregoing embodiments, some of the functions realized by software may be realized by hardware or some of the functions realized by hardware may be realized by software. In addition, the specific detailed configurations of the other units of the projector 100 can also be modified arbitrarily within the scope of the invention without departing from the gist of the invention.

What is claimed is:

1. A projector comprising:
a processor configured to receive an image signal as an input;
a display that displays an image based on the inputted image signal; and
an image displacement unit that changes a position of the image displayed by the display, wherein
the processor is configured to:
output a driving signal to the image displacement unit to drive the image displacement unit; and
control the outputted driving signal such that an output timing of the driving signal is changed corresponding to a change in a frequency of the image signal by correcting a delay time of the output timing based on a difference between the frequency of the image signal and a preset frequency.

2. The projector according to claim 1, further comprising:
a memory that stores information in which the frequency of the image signal is associated with the output timing of the driving signal,
wherein the processor acquires the output timing associated with the frequency of the image signal from the memory and outputs the driving signal at the acquired output timing.

3. The projector according to claim 1, wherein the processor calculates the output timing associated with the frequency of the image signal and outputs the driving signal at the calculated output timing.

4. The projector according to claim 1, wherein the processor sets a delay time of the output timing of the driving signal with respect to a vertical synchronization signal of the image signal.

5. The projector according to claim 1, wherein the processor changes the output timing of the driving signal in a case in which the frequency of the image signal is different from the preset frequency.

6. The projector according to claim 5, further comprising:
a memory that stores information in which the frequency of the image signal is associated with the output timing of the driving signal;
wherein the processor is configured to:
detect the frequency of the image signal;
calculate a correction value for correcting the output timing of the driving signal in a case in which the detected frequency is different from the preset frequency; and
correct the output timing of the driving signal acquired from the memory based on the calculated correction value.

7. The projector according to claim 6, wherein the processor is configured to:
calculate a correction value for latening the output timing of the driving signal in response to the detected frequency being less than the preset frequency, and
calculate a correction value for advancing the output timing of the driving signal in response to the detected frequency being greater than the preset frequency.

8. The projector according to claim 1, wherein:
the image displacement unit includes:
an optical member,
a movable unit that holds the optical member, and
an actuator that pivots the movable unit, and
the processor changes a current value of a driving current to be supplied as the driving signal to the image displacement unit according to the frequency of the image signal.

9. The projector according to claim 8, wherein:
the processor increases the current value of the driving current to be supplied to the image displacement unit in response to the frequency of the image signal being greater than the preset frequency, and the processor decreases the current value of the driving current to be supplied to the image displacement unit in response to the frequency of the image signal being less than the preset frequency.

10. A projector comprising:

a sensor that detects an attitude of the projector;

a processor configured to receive an image signal as an input;

a display that displays an image based on the inputted image signal; and an image displacement unit that includes an optical member held to be pivotable and changes a position of an image displayed by the display to a first display position and a second display position according to the detected attitude of the optical member, wherein the processor is configured to:

output a driving signal to the image displacement unit to drive the image displacement unit; and control the outputted driving signal by setting a waveform of the outputted driving signal output according to the attitude of the projector detected by the sensor.

11. A method of controlling a projector, the method comprising:

inputting an image signal;

displaying, by a display, an image based on the image signal;

driving an image displacement unit according to a driving signal to change a position of the image to be displayed by the display; and changing an output timing at which the driving signal is output to the image displacement unit according to a change in a frequency of the image signal by correcting a delay time of the output timing based on a difference between the frequency of the image signal and a preset frequency.

* * * * *